(12) United States Patent
Lv et al.

(10) Patent No.: US 11,223,750 B2
(45) Date of Patent: Jan. 11, 2022

(54) METHODS, SYSTEMS, AND MEDIA FOR TRANSMITTING DATA IN A VIDEO SIGNAL

(71) Applicant: ZHEJIANG XINSHENG ELECTRONIC TECHNOLOGY CO., LTD., Zhejiang (CN)

(72) Inventors: Bingyun Lv, Hangzhou (CN); Wei Fang, Hangzhou (CN); Weizhong Yao, Hangzhou (CN)

(73) Assignee: ZHEJIANG XINSHENG ELECTRONIC TECHNOLOGY CO., LTD., Hangzhou (CN)

( * ) Notice: Subject to any disclaimer, the term of this patent is extended or adjusted under 35 U.S.C. 154(b) by 69 days.

(21) Appl. No.: 16/251,237

(22) Filed: Jan. 18, 2019

(65) Prior Publication Data

US 2019/0174027 A1   Jun. 6, 2019

Related U.S. Application Data

(63) Continuation of application No. PCT/CN2017/092916, filed on Jul. 14, 2017.

(30) Foreign Application Priority Data

Jul. 18, 2016   (CN) .......................... 201610575545.4

(51) Int. Cl.
*H04N 5/21*   (2006.01)
*H04L 1/00*   (2006.01)
(Continued)

(52) U.S. Cl.
CPC .......... *H04N 5/211* (2013.01); *H04J 13/0029* (2013.01); *H04L 1/0083* (2013.01);
(Continued)

(58) Field of Classification Search
CPC ........ H04N 5/211; H04N 7/083; H04N 7/088; H04N 19/86; H04N 19/172; H04N 7/18;
(Continued)

(56) References Cited

U.S. PATENT DOCUMENTS 5,875,229 A * 2/1999 Eyuboglu ............... H04J 3/125
                                                      375/216
9,166,864 B1 * 10/2015 Galligan ............... H04L 65/604
(Continued)

FOREIGN PATENT DOCUMENTS

CN   101304524 A   11/2008
CN   101808056 A    8/2010
(Continued)

OTHER PUBLICATIONS

Extended European Search Report in European Application No. 17830421.8 dated May 23, 2019, 10 pages.
(Continued)

*Primary Examiner* — Nasim N Nirjhar
(74) *Attorney, Agent, or Firm* — Metis IP LLC

(57) ABSTRACT

The present disclosure relates to systems and methods for transmitting data in a video signal. The systems may perform the methods to generate a data frame, wherein the data frame may include at least a frame header and frame data, the frame header may include at least one autocorrelation and cross-correlation sequence; insert the data frame into an area of a video signal, wherein the inserted area of the video signal is not an area of line and field synchronization or an area of effective video; transmit the video signal having the data frame to another device.

13 Claims, 15 Drawing Sheets

(51) Int. Cl.
*H04N 7/088* (2006.01)
*H04N 7/083* (2006.01)
*H04N 19/172* (2014.01)
*H04N 19/86* (2014.01)
*H04J 13/00* (2011.01)
*H04L 25/03* (2006.01)

(52) U.S. Cl.
CPC .. *H04L 25/03006* (2013.01); *H04L 25/03828* (2013.01); *H04N 7/083* (2013.01); *H04N 7/088* (2013.01); *H04N 19/172* (2014.11); *H04N 19/86* (2014.11); *H04L 2025/03363* (2013.01)

(58) Field of Classification Search
CPC ............. H04L 1/0083; H04L 25/03828; H04L 25/03006; H04L 2025/03363; H04L 65/607; H04L 65/602; H04L 1/0008; H04J 13/0029
See application file for complete search history.

(56) References Cited

U.S. PATENT DOCUMENTS

| | | | | |
|---|---|---|---|---|
| 9,213,083 | B1* | 12/2015 | Carter | G01S 5/10 |
| 2003/0016770 | A1* | 1/2003 | Trans | H04L 1/0054 |
| | | | | 375/346 |
| 2008/0147218 | A1* | 6/2008 | Sugino | G11B 20/10527 |
| | | | | 700/94 |
| 2010/0309382 | A1* | 12/2010 | Matsubayashi | H04N 5/38 |
| | | | | 348/723 |
| 2011/0051863 | A1* | 3/2011 | Furukawa | H04L 25/0216 |
| | | | | 375/343 |
| 2014/0208379 | A1 | 7/2014 | Sinha et al. | |
| 2014/0355723 | A1 | 12/2014 | Song et al. | |
| 2015/0312507 | A1 | 10/2015 | Yin et al. | |
| 2016/0182189 | A1* | 6/2016 | Stadali | H04L 1/0088 |
| | | | | 370/474 |

FOREIGN PATENT DOCUMENTS

| | | |
|---|---|---|
| CN | 101841505 A | 9/2010 |
| CN | 102355444 A | 2/2012 |
| CN | 103152543 A | 6/2013 |
| CN | 104918016 A | 9/2015 |
| WO | 2018014787 A1 | 1/2018 |

OTHER PUBLICATIONS

First Office Action in Chinese Application No. 201610575545.4 dated Oct. 23, 2018, 19 pages.
International Search Report in PCT/CN2017/092916 dated Sep. 29, 2017, 4 pages.
Written Opinion in PCT/CN2017/092916 dated Sep. 29, 2017, 5 pages.

* cited by examiner

METHODS, SYSTEMS, AND MEDIA FOR TRANSMITTING DATA IN A VIDEO SIGNAL

CROSS-REFERENCE TO RELATED APPLICATIONS

This application is a Continuation of International Application No. PCT/CN2017/092916 filed on Jul. 14, 2017, which further claims priority to Chinese Application No. 201610575545.4 filed on Jul. 18, 2016, the contents of each of which are hereby incorporated by reference.

TECHNICAL FIELD

The present disclosure generally relates to methods, systems and media for video communications, and in particular, methods, systems and media for transmit data in a video signal.

BACKGROUND

In the field of video surveillance or transmission, demands for video, audio and control data transmission by using a single cable have become increasingly more, for it can effectively reduce the material cost and the construction cost and greatly reduce the difficulty of upgrading the system. However, the length of the cable and the interference may affect data extracting and the normal operation of the system, such as large scale errors of the extracted data.

SUMMARY

According to an aspect of the present disclosure, a method may include one or more of the following operations. The at least one processor may generate a data frame. The data frame may include at least a frame header and frame data, and the frame header may include at least one autocorrelation and cross-correlation sequence. The at least one processor may insert the data frame into an area of a video signal. The inserted area of the video signal may not an area of line and field synchronization or an area of effective video. The at least one processor may further transmit the video signal having the data frame to another device.

In some embodiments, the data frame may include an audio signal frame.

In some embodiments, the audio signal frame may be non-uniform quantized according to A-law or µ-law.

In some embodiments, an audio of the audio signal frame may be modulated based on a multilevel baseband method.

In some embodiments, the audio signal frame may be processed by a shaping filter, wherein the shaping filter may include a raised cosine shaping filter.

In some embodiments, the inserted area of the video signal may be one of: an area between an end of a color synchronization of a video active line and a cut-off point of a line blanking area, an area between an end of the color synchronization of a blanking line and the cut-off point of a line blanking area, or an effective area of a blanking line.

In some embodiments, the autocorrelation and cross-correlation sequence may be a Pseudo-Noise (PN) sequence or a Gold sequence.

In some embodiments, the data frame may further include a frame tail, the frame tail may include at least one auto-correlation and cross-correlation sequence.

In some embodiments, the frame tail may have same content as the frame header.

In some embodiments, the frame data may be encoded according to a spread spectrum coding method or a channel coding method.

According to another aspect of the present disclosure, a method may include one or more of the following operations. The at least one processor may obtain a video signal having a data frame, wherein the data frame may be inserted into an area of the video signal, the data frame may include at least a frame header and frame data, and the frame header may include at least one autocorrelation and cross-correlation sequence. The at least one processor may determine the frame header of the data frame. The at least one processor may further extract the frame data of the data frame based on the frame header of the data frame.

According to yet another aspect of the present disclosure, a system may include at least one storage medium and at least one processor configured to communicate with the at least one storage medium. The at least one storage medium may include a set of instructions for transmitting data. When the at least one processor executes the set of instructions, the at least one processor may be configured to cause the system to perform one or more of the following operations. The at least one processor may be configured to cause the system to generate a data frame, the data frame may include at least a frame header and frame data, wherein the frame header may include at least one autocorrelation and cross-correlation sequence. The at least one processor may also be configured to cause the system to insert the data frame into an area of a video signal, wherein the inserted area of the video signal is not an area of line and field synchronization or an area of effective video. The at least one processor may further be configured to cause the system to transmit the video signal having the data frame to another device.

According to yet another aspect of the present disclosure, a system may include at least one storage device and at least one processor configured to communicate with the at least one storage device. The at least one storage device may include a set of instructions. When executing the set of instructions, the at least one processor may be configured to cause the system to perform one or more of the following operations. The at least one processor may be configured to cause the system to obtain a video signal having a data frame. The data frame may be inserted into an area of the video signal. The data frame may include at least a frame header and frame data, and the frame header may include at least one autocorrelation and cross-correlation sequence. The at least one processor may also be configured to cause the system to determine the frame header of the data frame. The at least one processor may further be configured to cause the system to extract the frame data of the data frame based on the frame header of the data frame.

According to yet another aspect of the present disclosure, a non-transitory computer-readable medium may store a set of instructions. When executed by a processor of a computing device, the set of instructions may cause the computing device to perform the following operations: generating a data frame, wherein the data frame may include at least a frame header and frame data, and the frame header may include at least one autocorrelation and cross-correlation sequence; inserting the data frame into an area of a video signal, wherein the inserted area of the video signal may be not an area of line and field synchronization or an area of effective video; and transmitting the video signal having the data frame to another device.

According to yet another aspect of the present disclosure, a non-transitory computer-readable medium may store a set of instructions. When executed by a processor of a computing device, the set of instructions may cause the computing device to perform the following operations: obtaining a video signal having a data frame, wherein the data frame may be inserted into an area of the video signal, the data frame may include at least a frame header and frame data, and the frame header may include at least one autocorrelation and cross-correlation sequence; determining the frame header of the data frame; and extracting the frame data of the data frame based on the frame header of the data frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
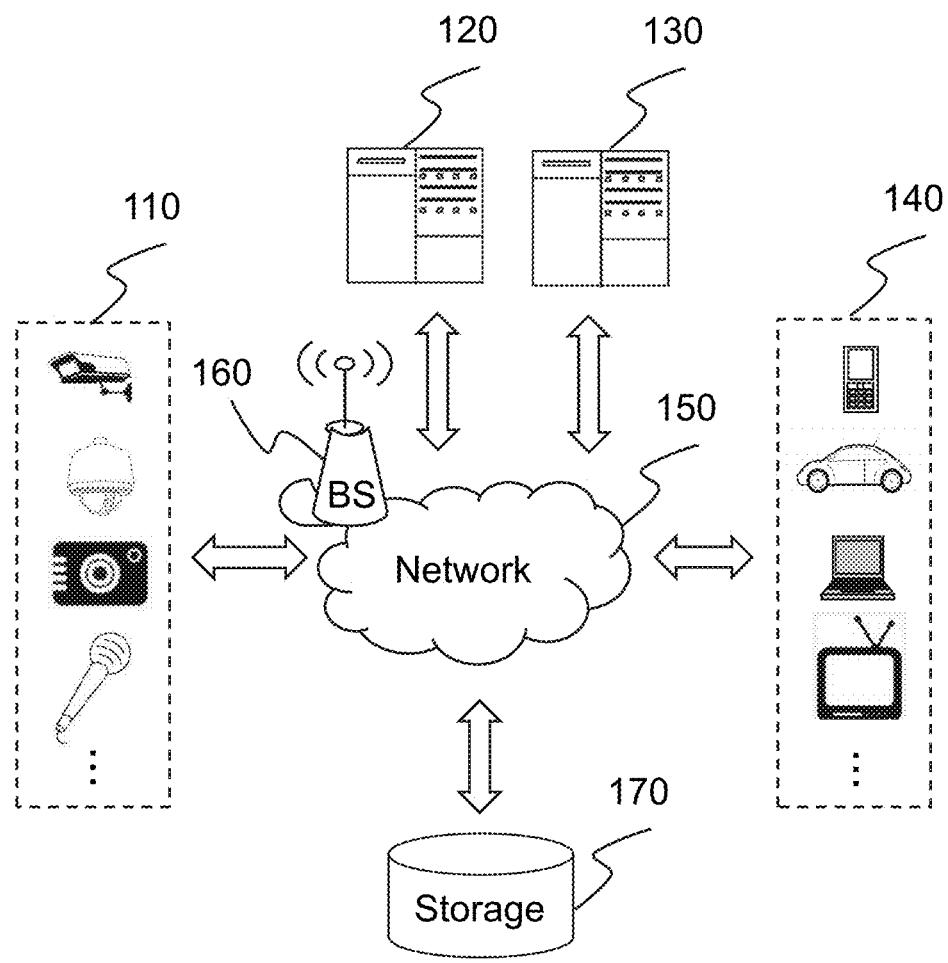
FIG. 1 is a schematic diagram of an exemplary system for transmitting data according to some embodiments of the present disclosure.

In accordance with various implementations, as described in more detail below, mechanisms, which can include systems, methods, and media, for data transmission in a video signal are provided.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "sub-unit" "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for transmitting data. The systems and methods may generate a data frame, the data frame including at least a frame header and frame data, the frame header including at least one autocorrelation and cross-correlation sequence. The systems and methods may insert the data frame into an area of a video signal, wherein the inserted area of the video signal is not an area of line and field synchronization or an area of effective video. The systems and methods may transmit the video signal having the data frame to another device.

Another aspect of the present disclosure relates to systems and methods for extracting data. The systems and methods may obtain a video signal having a data frame, wherein the data frame is inserted into an area of the video signal, the data frame including at least a frame header and frame data, the frame header including at least one autocorrelation and cross-correlation sequence. The systems and methods may determine the frame header of the data frame. The systems and methods may extract the frame data of the data frame based on the frame header of the data frame.

FIG. 1 is a schematic diagram of an exemplary system 100 for transmitting data according to some embodiments of the present disclosure. As illustrated, the data transmission system 100 may include a video device 110, a data transmission device 120, a data reception device 130, a terminal 140, a network 150, a base station 160, a storage 170, and/or any other suitable component for transmitting data in accordance with various embodiments of the disclosure.

The video device 110 may be configured to make one or more videos. The one or more videos may be videos about a static or moving object. The video may include a video (offline or live streaming), a frame of a video, or a combination thereof.

The video device 110 may be any suitable device that is capable of making a video. The video device 110 may include a camera, a sensor, a video recorder, or the like, or any combination thereof. The video device 110 may include any suitable type of camera, such as a fixed camera, a fixed dome camera, a covert camera, a Pan-Tilt-Zoom (PTZ) camera, a thermal camera. The video device 110 may include any suitable type of sensor, such as an audio sensor, a light sensor, a wind speed sensor, or the like, or a combination thereof.

Data obtained by the video device 110 (e.g., images, audio signals, video signals) may be stored in the storage 170, and/or sent to the data transmission device 120, the data reception device 130, or the terminal(s) 140 via the network 150.

The data transmission device 120 may be configured to transmit data to another device, such as the data reception device 130. The data may include a video signal frame, an audio frame, a communication frame, or the like, or a combination thereof. The data may be captured by the video device 110 or retrieved from another source (e.g., the storage 170, the terminal(s) 140). The data transmission device 120 may also be configured to generate a data frame, such as an audio signal frame. The data transmission device 120 may further be configured to insert the data frame into an area of a signal, such as a video signal.

The data transmission device 120 may further be configured to generate a control signal. The control signal may be generated based on a feature of an object, a video of the object, or the like, or a combination. The control signal may be used to control the video device 110. For example, the data transmission device 120 may generate a control signal to make a camera of the video device 110 to track an object and obtain a video of the object.

The data transmission device 120 may be any suitable device that is capable of transmitting data to another device. For example, the data transmission device 120 may include a high-performance computer specializing in data processing or transaction processing, a personal computer, a portable device, a server, a microprocessor, an integrated chip, a digital signal processor (DSP), a tablet computer, a personal digital assistant (PDA), or the like, or a combination thereof. In some embodiments, the data transmission device 120 may be implemented on a computing device 200 shown in FIG. 2.

The data reception device 130 may be configured to receive data from another device, such as the data transmission device 120. The data may include a video signal having a data frame. The data reception device 130 may also be configured to detect a frame header of a data frame, such as a sign of an audio signal frame. The data reception device 130 may further be configured to extract frame data of the data frame, such as audio data of the audio signal frame.

The data reception device 130 may be any suitable device that is capable of receiving data from another device. For example, the data reception device 130 may include a high-performance computer specializing in data processing or transaction processing, a personal computer, a portable device, a server, a microprocessor, an integrated chip, a digital signal processor (DSP), a tablet computer, a personal digital assistant (PDA), or the like, or a combination thereof. In some embodiments, the data reception device 130 may be implemented on a computing device 200 shown in FIG. 2.

The terminal 140 may be connected to or communicate with the data transmission device 120 or the data reception device 130. The terminal 140 may allow one or more operators to control the production and/or display of the data (e.g., the video captured by the video device 110) on a display. The terminal 140 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alphanumeric and other keys that may be inputted via a keyboard, a touch screen (e.g., with haptics or tactile feedback), a speech input, an eye tracking input, a brain monitoring system, or any other comparable input mechanism. The input information received through the input device may be communicated to the data transmission device 120 or the data reception device 130 via the network 150 for further processing. Another type of the input device may include a cursor control device, such as a mouse, a trackball, or cursor direction keys to communicate direction information and command selections to, for example, the data transmission device 120 or the data reception device 130 and to control cursor movement on display or another display device.

A display may be configured to display the data received (e.g., the video captured by the video device 110). The information may include data before and/or after data processing, a request for input or parameter relating to video acquisition and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

The network 150 may facilitate communications between various components of the data transmission system 100. The network 150 may be a single network, or a combination of various networks. The network 150 may be a wired network or a wireless network. The wired network may include using a Local Area Network (LAN), a Wide Area Network (WAN), a Bluetooth, a ZigBee, a Near Field Communication (NFC), or the like, or a combination thereof. The wireless network may be a Bluetooth, a Near Field Communication (NFC), a wireless local area network (WLAN), Wi-Fi, a Wireless Wide Area Network (WWAN), or the like, or a combination thereof. The network 150 may also include various network access points, e.g., wired or wireless access points such as base stations 160 or Internet exchange points through which a data source may connect to the network 150 in order to transmit information via the network 150.

The storage 170 may store data, relevant information or parameters. The data may include a video (e.g., a video obtained by the video device 110), an audio signal and/or communication data. The relevant information may be a sequence, line and field synchronization of a video signal, an encoding method, a non-uniform quantizing method, or a modulating method. See, for example, FIGS. 11, 12, 16, 18, 19, 20, 21, 22 and 23 and the description thereof. Exemplary parameters may include an intrinsic parameter (e.g., a focal length, a lens distortion parameter), an extrinsic parameter (e.g., the pose of a camera, a position parameter of the camera) of one or more cameras of the video device 110. For example, the parameter may include a correlation parameter and one or more thresholds that may be used to determine a frame header of a data frame, as described in FIGS. 13, 15, 17 and the description thereof. As another example, the parameter may include a number that may be used to determine an enable signal for extracting data as described in FIG. 14 and the description thereof.

It should be noted that the descriptions above in relation to the data transmission system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the video data generated by the video device 110, may be processed by the terminal 140. In some embodiments, the video device 110, the data transmission device 120 and the data reception device 130 may be implemented in one single device configured to perform the functions of the video device 110, the data transmission device 120 and the data reception device 130 described in this disclosure. In some embodiments, the data transmission device 120 may be combined with or part of the data reception device 130 as a single device. In some embodiments, the terminal 140, and the storage 170 may be combined with or part of the data transmission device 120 and the data reception device 130 as a single device. Similar modifications should fall within the scope of the present disclosure.

Figure 2:
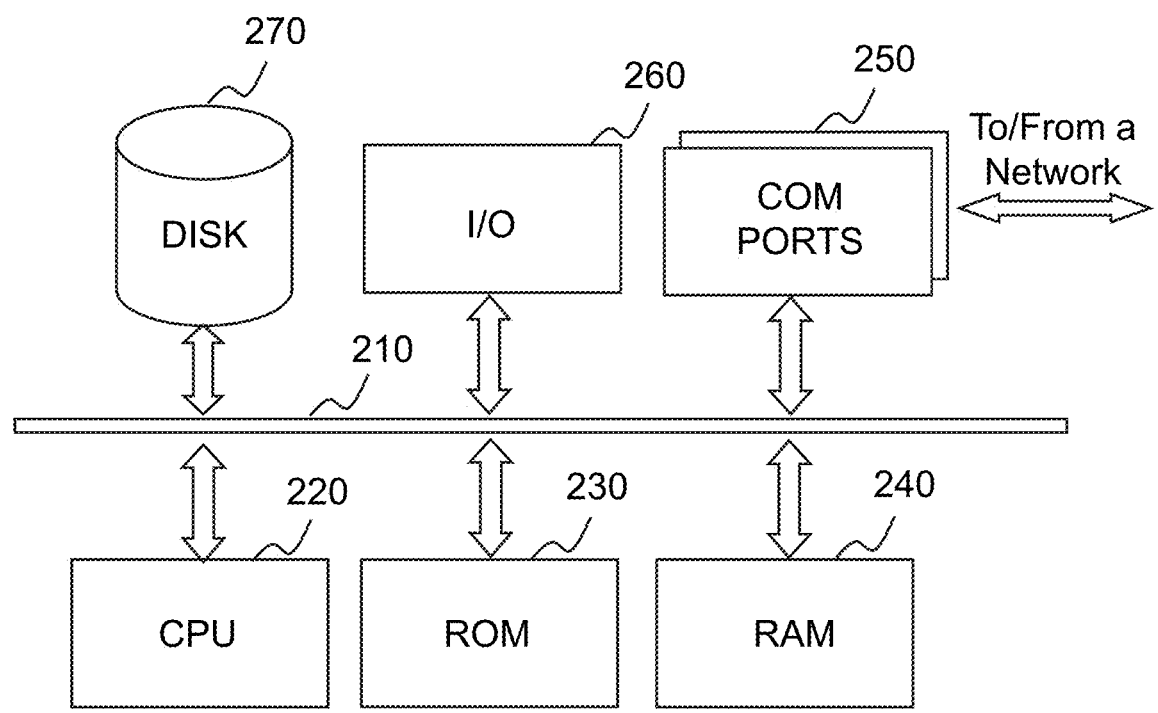
FIG. 2 is a schematic diagram illustrating an exemplary computing device according to some embodiments of the present disclosure.

FIG. 2 is a schematic diagram illustrating exemplary hardware and software components of a computing device 200 on which the video device 110, the data transmission device 120, the data reception device 130, and/or the terminal 140 may be implemented according to some embodiments of the present disclosure. For example, the data transmission device 120 may be implemented on the computing device 200 and configured to perform functions of the data transmission device 120 disclosed in this disclosure.

The computing device 200 may be a general-purpose computer or a special-purpose computer; both may be used to implement a data transmission system for the present disclosure. The computing device 200 may be used to implement any component of the data transmission as described herein. For example, the data transmission device 120 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or any other type of non-transitory storage medium to be executed by the CPU 220. The methods and/or processes of the present disclosure may be implemented as the program instructions. The computing device 200 also includes an I/O component 260, supporting input/output between the computer and other components therein. The computing device 200 may also receive programming and data via network communications.

Merely for illustration, only one CPU and/or processor is illustrated in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
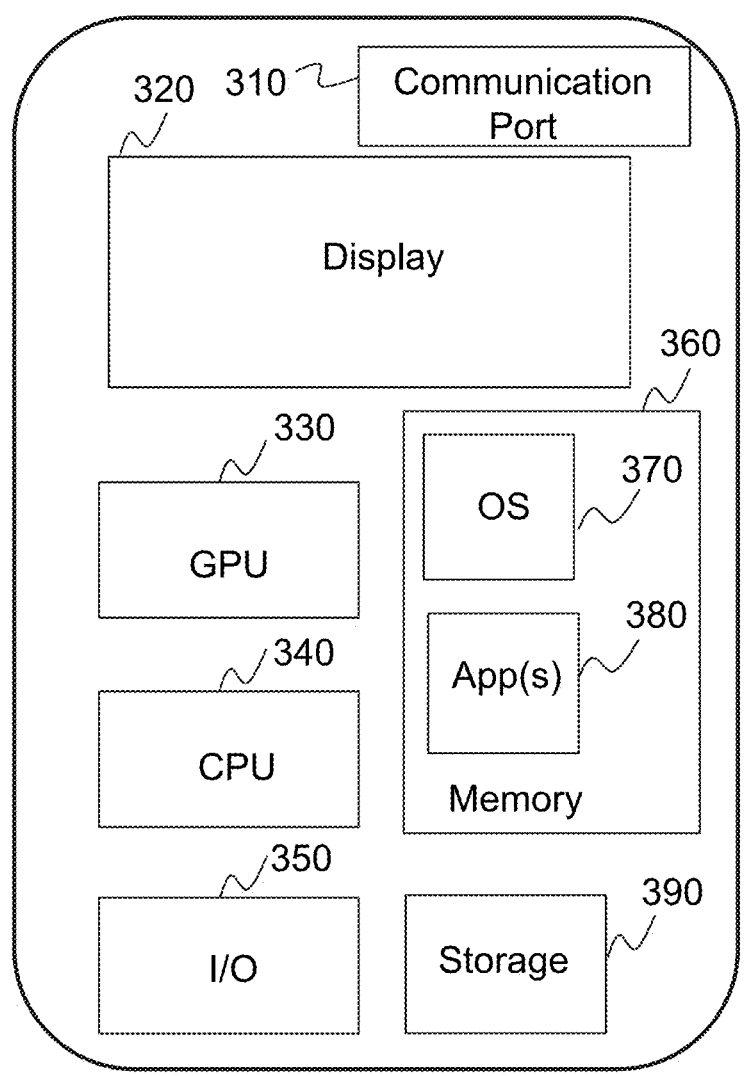
FIG. 3 is a schematic diagram illustrating exemplary hardware and/or software components of an exemplary mobile device on which the terminal may be implemented according to some embodiments of the present disclosure.

FIG. 3 is a schematic diagram illustrating exemplary hardware and/or software components of an exemplary mobile device 300 on which the terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to transmitting data in a video signal or other information from, for example, the data transmission device 120. User interactions with the information stream may be achieved via the I/O 350 and provided to the data transmission device 120 and/or other components of the data transmission system 100 via the network 150.

Figure 4:
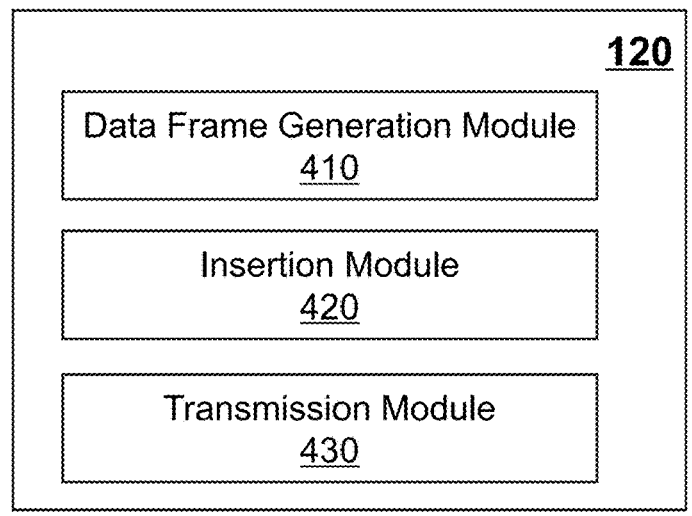
FIG. 4 is a block diagram illustrating an exemplary data transmission device according to some embodiments of the present disclosure.

FIG. 4 is a block diagram illustrating an exemplary data transmission device 120 according to some embodiments of the present disclosure. The data transmission device 120 may include a data frame generation module 410, an insertion module 420, and a transmission module 430.

The data frame generation module 410 may be configured to generate one or more data frames. The data frame generation module 410 may generate a communication frame, an audio data frame, or the like, or any combination thereof. The data frame generation module 410 may generate a frame header, frame data, and a frame tail respectively. In some embodiments, the data frame generation module 410 may generate the frame header or the frame tail based on one or more sequences (e.g., a Pseudo-Noise (PN) sequence or a Gold sequence). For example, the PN sequence may be generated by a linear feedback shift register (LFSR) which is constructed according to a corresponding primitive polynomial. The data frame generation module 410 may generate the frame header by using at least one PN sequence. In some embodiments, the frame tail may be generated in a same way as the frame header. In some embodiments, the data frame generation module 410 may encode the frame data according to an encoding method (e.g., a spread spectrum coding method or a channel coding method).

The insertion module 420 may be configured to insert the data frame into an area of a video signal. The insertion module 420 may insert the data frame into the area beyond the area of line and field synchronization and the effective area of the video. For example, the insertion module 420 may insert the data frame into the area between an end of a color synchronization of a video active line and a cut-off point of a line blanking area, the area between an end of the color synchronization of a blanking line and the cut-off point of a line blanking area, or the effective area of a blanking line, or the like, or any combination thereof.

The transmission module 430 may be configured to transmit the video signal having the data frame to another device. In some embodiments, the transmission module 430 may transmit the video signal having the data frame to a receiving device via the network 150. For example, the transmission module 430 may transmit the video signal having the data frame to the data reception device 130 for further processing. As another example, the transmission module 430 may transmit the video signal having the data frame to a terminal (e.g., the terminal(s) 140).

The transmission module 430 may further convert the video signal having the data frame to an analog signal by a digital to analog converter (DAC). In the transition of DAC, the sampling point(s) ($N_d$) of one symbol period in the frame header, the frame data, or the frame tail is more than or equal to 1.

The modules in the data transmission device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the transmission module 430 may be integrated into the insertion module 420 as a single module which may both insert the data frame into an area of the video signal and transmit the video signal having the data frame to another device. As another example, the data transmission device 120 may include a storage module (not shown in FIG. 4) which may be configured to store the data frame, the video signal and/or the video signal having the data frame. As a further example, the transmission module 430 may transmit the data frame, the video signal to another device.

Figure 5:
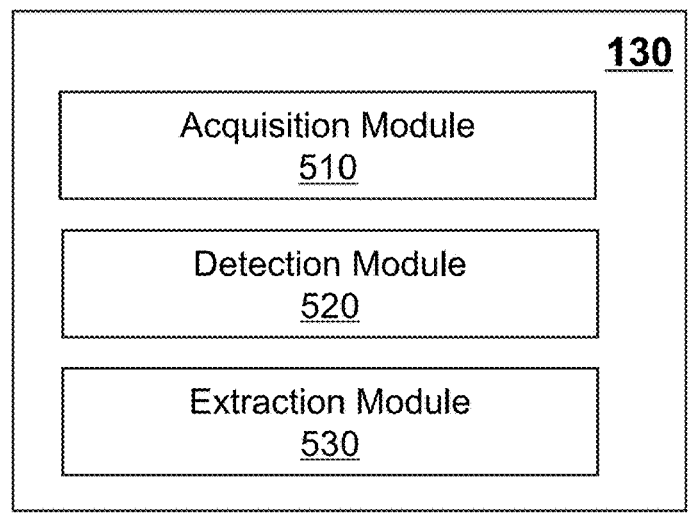
FIG. 5 is a block diagram illustrating an exemplary data reception device according to some embodiments of the present disclosure.

FIG. 5 is a block diagram illustrating an exemplary data reception device 130 according to some embodiments of the present disclosure. The data reception device 130 may include an acquisition module 510, a detection module 520, and an extraction module 530.

The acquisition module 510 may be configured to obtain one or more video signals having a data frame. The acquisition module 510 may obtain the video signal having the data frame from another device (e.g., the data transmission device 120) via the network 150. The acquisition module 510 may retrieve the video signal having the data frame from another source (e.g., the storage 170, the terminal(s) 140). The acquisition module 510 may analyze the video signal having the data frame and determine information related to the video signal having the data frame (e.g., an area where the data frame is inserted into the video signal).

The acquisition module 510 may further obtain relevant information associated with the video signal. For example, the acquisition module 510 may obtain format information about the video signal.

The acquisition module 510 may further convert the video signal having the data frame to a digital signal by an analog to digital converter (ADC). In the transition of ADC, the sampling point(s) ($N_a$) of one symbol period in the frame header, the frame data, or the frame tail is more than or equal to 1. For the video signal with a fixed format, the proportional relation between $N_d$ and $N_a$ is unique.

The detection module 520 may be configured to detect a frame header of the data frame. In some embodiments, the detection module 520 may perform an operation between a known autocorrelation and cross-correlation sequence and the video signal having the data frame and determine a correlation parameter during the operation. The detection module 520 may determine whether the frame header of the data frame is detected based on a comparison between the correlation parameter and a threshold and/or a number threshold.

The detection module 520 may also be configured to detect a frame tail of the data frame. In some embodiments, the frame tail may be detected in a same way as the frame header.

The extraction module 530 may be configured to extract frame data of the data frame. The extraction module 530 may extract the frame data of the data frame after the frame header of the data frame is detected. In some embodiments, for the frame data not been encoded, the extraction module 530 may extract the frame data based on a hard decision decoding. In some embodiments, for the frame data have been encoded according to an encoding method, the extraction module 530 may decode the frame data according to a corresponding decoding method. For example, when the encoding method is a spread spectrum coding method, the extraction module 530 may extract the frame data by despreading the frame data. As another example, when the encoding method is a channel coding method (e.g., a Gray code encoding method), the extraction module 530 may extract the frame data by decoding the frame data with the channel coding method.

The extraction module 530 may be further configured to send the frame data of the data frame to some modules for further processing. For example, the extraction module 530 may sent the frame data of the data frame to a CPU (e.g., the CPU 220 of the computing device 200).

The modules in the data reception device 130 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 510 may be integrated into the detection module 520 as a single module which may both obtain the video signal having the data frame and detect the frame header of the data frame. As another example, the data reception device 130 may include a storage module (not shown in FIG. 5) which may be configured to store the data frame, the video signal and/or the video signal having the data frame.

Figure 6:
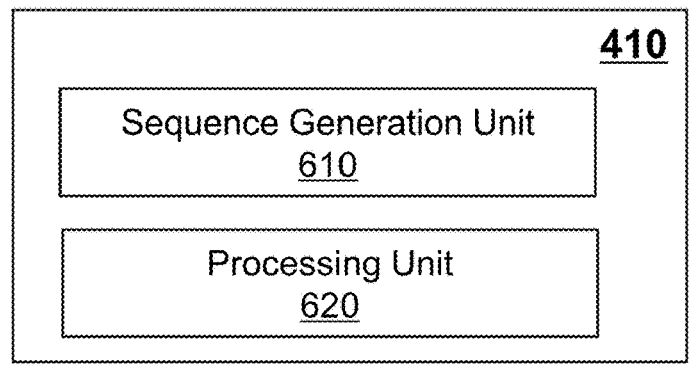
FIG. 6 is a block diagram illustrating an exemplary data frame generation module according to some embodiments of the present disclosure.

FIG. 6 is a block diagram illustrating an exemplary data frame generation module 410 according to some embodiments of the present disclosure. The data frame generation module 410 may include a sequence generation unit 610 and a processing unit 620.

The sequence generation unit 610 may be configured to generate one or more sequences. In some embodiments, the sequence generation unit 610 may be a linear feedback shift register (LFSR). For example, the linear feedback shift register (LFSR) which is constructed according to a corresponding primitive polynomial may generate one or more PN sequences.

The processing unit 620 may be configured to process frame data. In some embodiments, the processing unit 620 may encode the frame data according to an encoding method. For example, the processing unit 620 may encode the frame data according to a spread spectrum coding method, a channel coding method, or the like, or any combination thereof.

The units in the data frame generation 410 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined as a single unit, and any one of the units may be divided into two or more sub-units. For example, the processing unit 620 may be integrated into sequence generation unit 610 as a single unit which may both generate the sequence and process the frame data. As another example, the data frame generation 410 may include a storage unit (not shown in FIG. 6) which may be configured to store the sequences, the frame data and/or the encoding methods.

Figure 7:
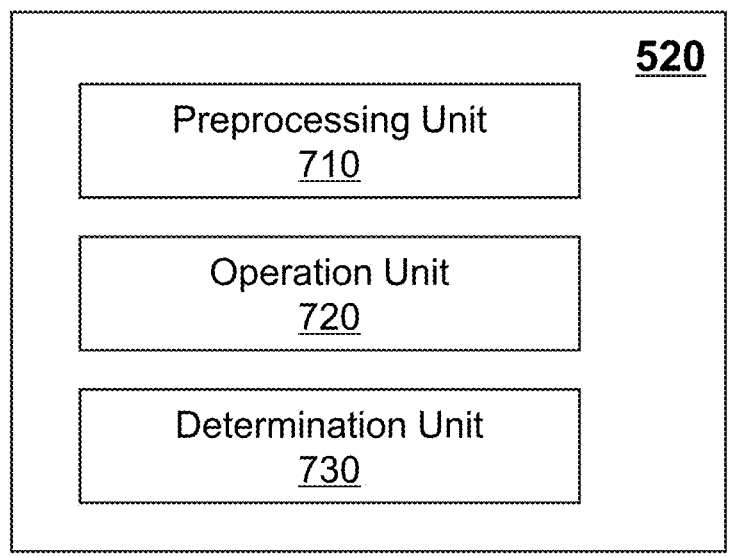
FIG. 7 is a block diagram illustrating an exemplary detection module according to some embodiments of the present disclosure.

FIG. 7 is a block diagram illustrating an exemplary detection module 520 according to some embodiments of the present disclosure. The detection module 520 may include a preprocessing unit 710, an operation unit 720, and a determination unit 730.

The preprocessing unit 710 may be configured to preprocess a video signal having a data frame. In some embodiments, the preprocessing unit 710 may estimate format of the video signal having the data frame and determine line and field synchronization information of the video signal having the data frame.

The operation unit 720 may be configured to perform a correlation operation. In some embodiments, the operation unit 720 may perform the operation between a known sequence and the video signal having the data frame.

The determination unit 730 may be configured to determine some information about the video signal having the data frame. In some embodiments, the determination unit 730 may determine one or more correlation parameters while performing the correlation operation based on the known sequence and the video signal having the data frame. In some embodiments, the determination unit 730 may determine whether the correlation parameters exceed a threshold. In some embodiments, the determination unit 730 may determine an effective window including occurrences that the correlation parameters exceed the threshold exceeds a number threshold. In some embodiments, the determination unit 730 may determine whether a frame header of the data frame is detected. For example, the determination unit 730 may determine the frame header of the data frame is detected based on the determination that the effective window has been determined. As another example, the determination unit 730 may determine no frame header of the data frame is detected based on the determination that the correlation parameter is less than or equal to the threshold. As still another example, the determination unit 730 may determine no frame header of the data frame is detected based on the determination that the effective window has been determined. In some embodiments, the determination unit 730 may determine a peak value of the correlation parameters. In some embodiments, the determination unit 730 may determine a value for extracting frame data based on the peak value of the correlation parameters.

The units in the detection module 520 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined as a single unit, and any one of the units may be divided into two or more sub-units. For example, the operation unit 720 may be integrated into the determination unit 730 as a single unit which may both perform the operation and determine the information about the video signal having the data frame. As another example, the detection module 520 may include a storage unit (not shown in FIG. 7) which may be configured to store the video signal having the data frame, the correlation parameters, the threshold and/or the number threshold.

Figure 8:
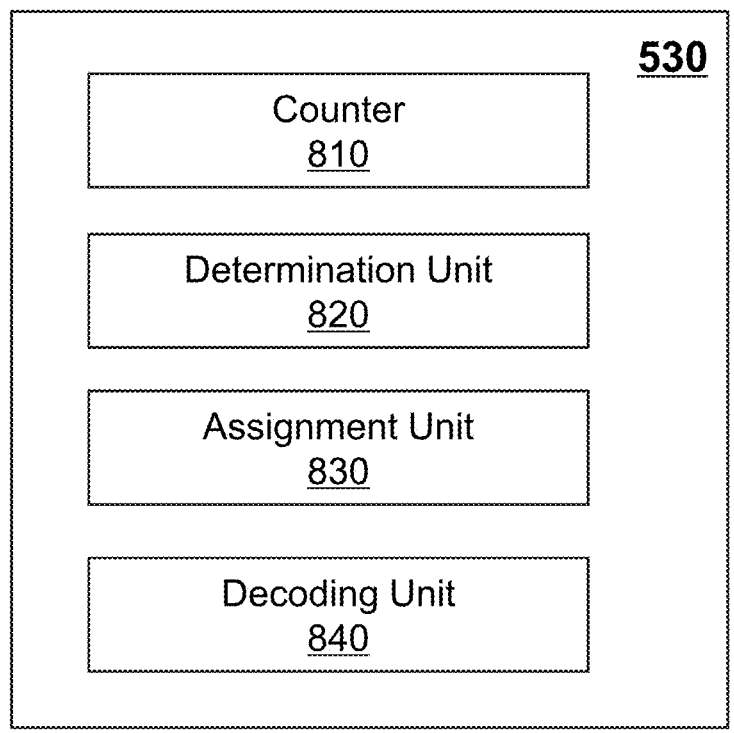
FIG. 8 is a block diagram illustrating an exemplary extraction module according to some embodiments of the present disclosure.

FIG. 8 is a block diagram illustrating an exemplary extraction module 530 according to some embodiments of the present disclosure. The extraction module 530 may include a counter 810, a determination unit 820, an assignment unit 830, and a decoding unit 840.

The counter 810 may be configured to count a number ($N_1$). The counting range of the counter 810 may be 1 to $N_2$.

The determination unit 820 may be configured to determine information about frame data. In some embodiments, the determination unit 820 may determine whether $N_2/2-K_1 \leq N_1 \leq N_2/2+K_2$. In some embodiments, the determination unit 820 may determine an enable signal for extracting the frame data. In some embodiments, the determination unit 820 may determine whether a correlation parameter exceeds a positive threshold. In some embodiments, the determination unit 820 may determine whether the correlation parameter exceeds a negative threshold when the correlation parameter is less than or equal to the positive threshold.

The assignment unit 830 may be configured to assign a value to the frame data. In some embodiments, the assignment unit 830 may be configured to assign a first value (e.g., 0) to the frame data based on the determination that the correlation parameter is less than or equal to the negative threshold. In some embodiments, the assignment unit 830 may be configured to assign a second value (e.g., 1) to the frame data based on the determination that the correlation parameter exceeds the positive threshold.

The decoding unit 840 may be configured to decode the frame data. In some embodiments, for the frame data have been encoded according to an encoding method, the decoding unit 840 may decode the frame data according to a corresponding decoding method. For example, when the encoding method is a spread spectrum coding method, the decoding unit 840 may extract the frame data by despreading the frame data. As another example, when the encoding method is a channel coding method (e.g., a Gray code encoding method), the decoding unit 840 may extract the frame data by decoding the channel coding.

The units in the extraction module 530 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined as a single unit, and any one of the units may be divided into two or more sub-units. For example, the assignment unit 830 may be integrated into determination unit 820 as a single unit which may both determine the information about the frame data and assign the value to the frame data. As another example, the extraction module 530 may include a storage unit (not shown in FIG. 8) which may be configured to store the frame data, the number, the enable signal, the correlation parameter, the positive threshold and/or the negative threshold.

Figure 9:
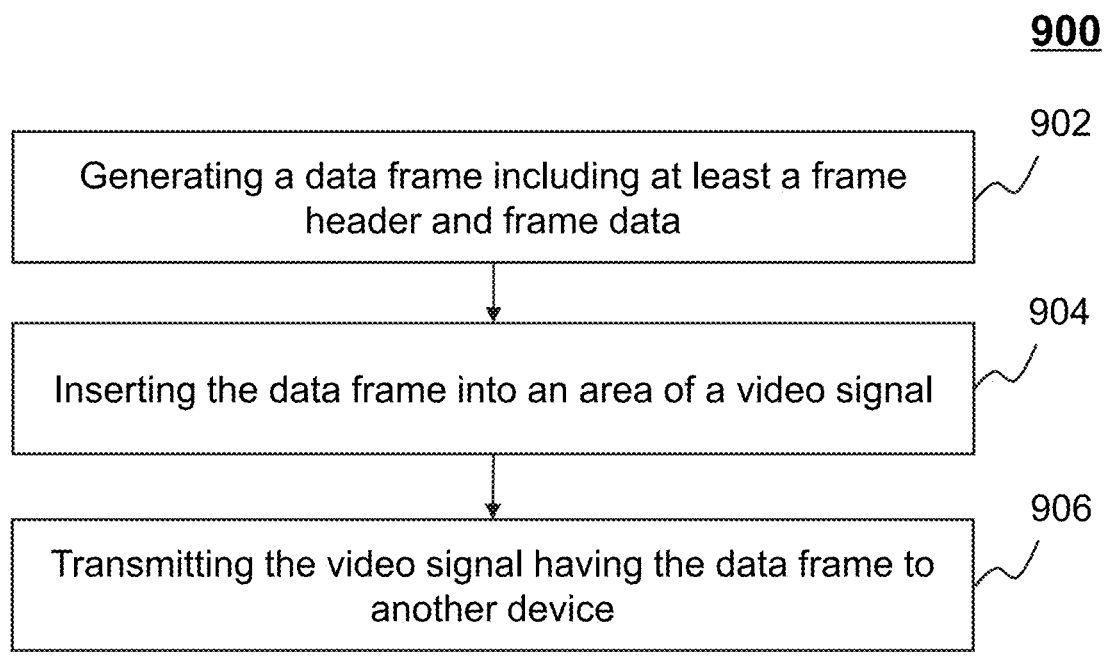
FIG. 9 is a flowchart illustrating an exemplary process for inserting a data frame into an area of a video signal according to some embodiments of the present disclosure.

FIG. 9 is a flowchart illustrating an exemplary process 900 for inserting a data frame into an area of a video signal according to some embodiments of the present disclosure. The process 900 may be executed by the data transmission device 120 as exemplified in FIG. 1 and FIG. 4 and the description thereof. For example, the process 900 may be implemented as a set of instructions (e.g., an application) stored in the storage ROM 230 or RAM 240. The CPU 220 may execute the set of instructions and may accordingly be directed to perform the process 900. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 9 and described below is not intended to be limiting.

In 902, a data frame including at least a frame header and frame data may be generated. In some embodiments, one or more operations of 902 may be performed by the data frame generation module 410. In some embodiments, the data frame including at least the frame header and the frame data may be generated based on one or more sequences and data as exemplified in FIG. 11. In some embodiments, the data frame is not a video frame. The data frame may include a communication frame, an audio signal frame, or the like, or any combination thereof. In some embodiments, the data frame may include the frame header and the frame data. Alternatively, the data frame may include the frame header, the frame data, and a frame tail. The frame header may include at least one autocorrelation and cross-correlation sequence. The autocorrelation and cross-correlation sequence may be a Pseudo-Noise (PN) sequence or a Gold sequence. The PN sequence may be generated by a linear feedback shift register (LFSR) according to a corresponding primitive polynomial. The frame tail may include at least one autocorrelation and cross-correlation sequence. In some embodiments, the frame tail has the same autocorrelation and cross-correlation sequence as the frame header.

In some embodiments, the frame data is not video data. The frame data may include communication data, audio data, or the like, or any combination thereof. In some embodiments, the frame data may not be encoded. In some embodiments, the frame data may be encoded according to an encoding method, such as a spread spectrum coding method or a channel coding method. Encoding the frame data may improve the reliability of data transmission and reduce the error rate of receiving the frame data if the transmission line is long and the transmission condition is poor.

In 904, the data frame may be inserted into an area of a video signal. In some embodiments, one or more operations of 904 may be performed by the insertion module 420.

In some embodiments, the data frame may be inserted into an area of the video signal (or referred to as the inserted area) that is not an area of line and field synchronization or an area of effective video. For example, the inserted area may be the blanking line of a composite video broadcast signal (CVBS) shown in FIG. 18. The inserted area of the video signal may be an area between an end of a color synchronization of a video active line and a cut-off point of a line blanking area, an area between an end of the color synchronization of a blanking line and the cut-off point of a line blanking area, or an effective area of a blanking line, or the like, or any combination thereof. The blanking line may include an effective area and a blanking area shown in FIG. 19.

In 906, the video signal having the data frame may be transmitted to another device. In some embodiments, one or more operations of 906 may be performed by the transmission module 430. In some embodiments, the video signal having the data frame may be transmitted to a receiving device, such as the data reception device 130.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the generated data frame and/or the video signal with the data frame inserted) may be added somewhere in the exemplary process 900.

Figure 10:
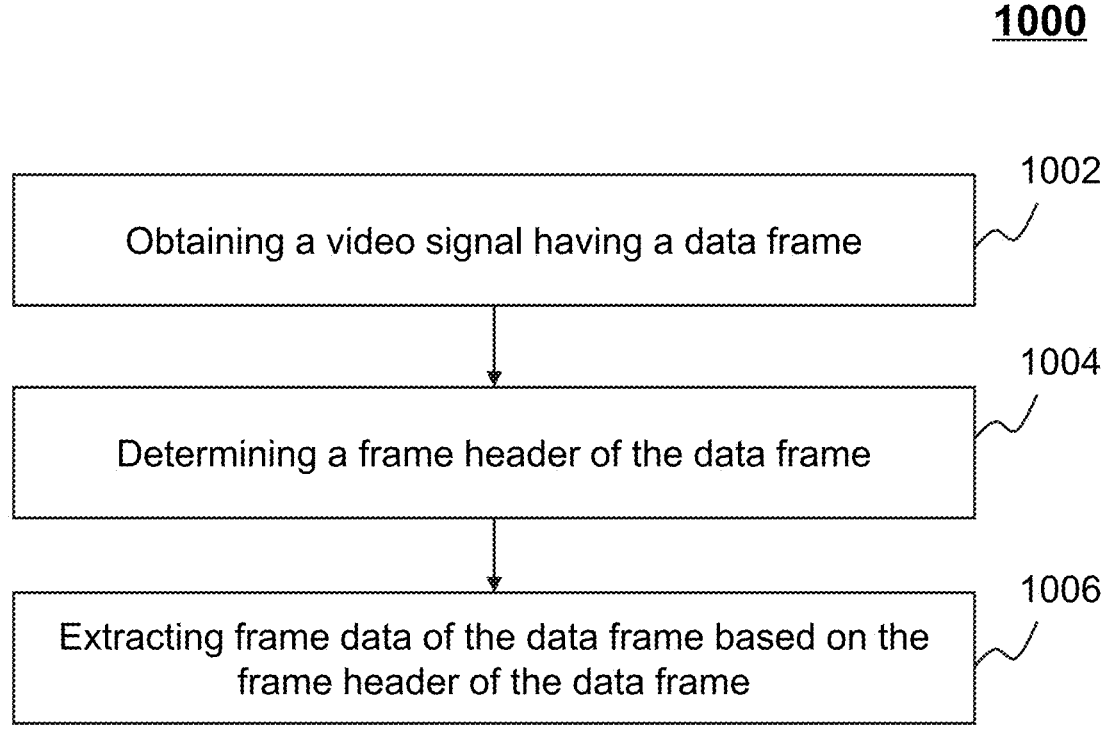
FIG. 10 is a flowchart illustrating an exemplary process for extracting frame data of a data frame according to some embodiments of the present disclosure.

FIG. 10 is a flowchart illustrating an exemplary process 1000 for extracting frame data of a data frame according to some embodiments of the present disclosure. The process 1000 may be executed by the data reception device 130. For example, the process 1000 may be implemented as a set of instructions (e.g., an application) stored in the storage ROM 230 or RAM 240. The CPU 220 may execute the set of instructions and may accordingly be directed to perform the process 1000. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 10 and described below is not intended to be limiting.

In 1002, a video signal having a data frame may be obtained. In some embodiments, one or more operations of 1002 may be performed by the acquisition module 510. The video signal having the data frame may be obtained from the data transmission device 120 or retrieved from another source (e.g., the storage 170, the terminal(s) 140). The data frame may be the data frame described elsewhere in this disclosure (e.g., the descriptions related to step 902 of the process 900).

In 1004, a frame header of the data frame may be determined. In some embodiments, one or more operations of 1004 may be performed by the detection module 520. In some embodiments, the frame header may be determined based on a correlation parameter, a threshold, and a number threshold as exemplified in FIGS. 12 and 13. An operation based on a known autocorrelation and cross-correlation sequence and the video signal may be performed. For example, the correlation parameter may be determined during the operation. The correlation parameter may reach a peak value while the known sequence aligns with the sequence of the data frame. If the detection module 520 determines that the reference parameter exceeds the threshold, it may further determine that the frame header of the data frame is detected upon the occurrence of a condition. For example, if the detection module 520 determines that the occurrences that the correlation parameter exceeds the threshold exceed the number threshold, it may determine that the frame header of the data frame is detected.

It should be noted that a jump point representing from an invalid data frame to a valid data frame may not correspond to an ideal point of sampling the frame data. The ideal point of sampling the frame data may be the correlation parameter having the peak value. In the process of actual processing, the data frame may be fine-tuned according to a relationship between the jump point and the ideal point.

In 1006, the frame data of the data frame may be extracted based on the frame header of the data frame. In some embodiments, one or more operations of 1006 may be performed by the extraction module 530. The frame header of the data frame may be a start point of the data frame. The frame data of the data frame may be extracted after the frame header of the data frame is detected. In some embodiments, the frame data of the data frame may be sent to another module (e.g., a CPU) for further processing.

In some embodiments, the frame data of the data frame may be encoded the frame data according to an encoding method (i.e., as shown in 902). In response to the encoded frame data, the extraction module 530 may extract the frame data after the frame data are decoded according to the decoding method. For example, the frame data may be extracted by dispreading the frame data with a spread spectrum coding method. Dispreading the frame data may improve the signal to noise ratio (SNR) of the frame data and reduce the error rate of the frame data. As another example, the frame data may be extracted by decoding the frame data according to the channel coding with a channel coding method. The channel coding may increase the reliability of communication. The channel coding may detect and correct the errors in the received bit stream by adding some redundant bits, and with the redundant bits, information may be carried by more bits.

In the process of demodulation and decoding, the decoding method may include hard decision decoding and soft decision decoding. Upon using the same algorithm, the hard decision decoding may be simpler and easier to implement. However, with the hard decision, the coding gain of 2-3 dB may be lost. Especially when the original bit error rate is very high, the soft decision decoding may be much better than the hard decision decoding. The soft decision decoding may be better than the hard decision decoding in performance.

In some embodiments, the frame data of the data frame may not be encoded and the frame data may be extracted by the hard decision decoding.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 1000. Modulation recognition and line and field synchronization of the video signal having the data frame may be performed after the step 1002. As another example, a frame tail of the data frame may be determined after the step 1006. The frame tail may have the same content as the frame header. The data reception device 130 may receive a next data frame while the frame tail of the data frame is determined or number of extracting the frame data of the data frame reaches a set number.

Figure 11:
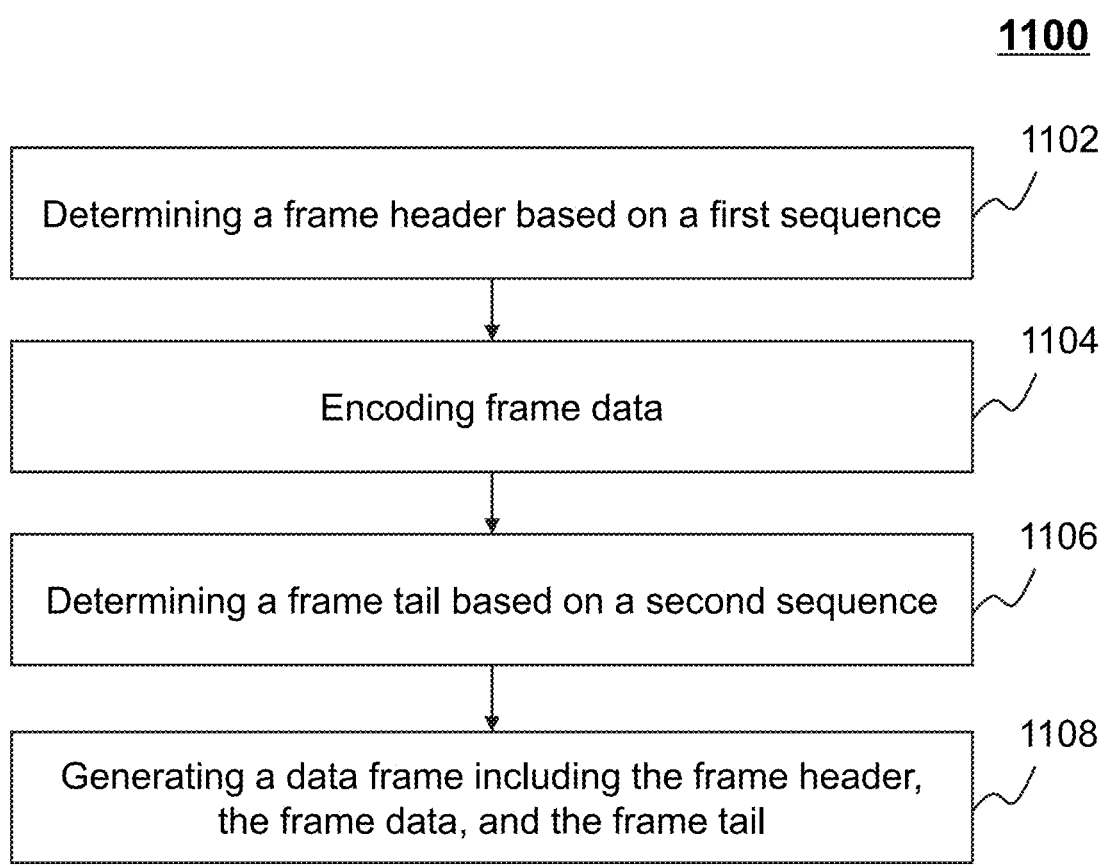
FIG. 11 is a flowchart illustrating an exemplary process for generating a data frame according to some embodiments of the present disclosure.

FIG. 11 is a flowchart illustrating an exemplary process 1100 for generating a data frame according to some embodiments of the present disclosure. The process 1100 may be executed by the data frame generation module 410. For example, the process 1100 may be implemented as a set of instructions (e.g., an application) stored in the storage ROM 230 or RAM 240. The CPU 220 may execute the set of instructions and may accordingly be directed to perform the process 1100. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 11 and described below is not intended to be limiting. In some embodiments, step 902 illustrated in process 900 may be performed according to process 1100.

In 1102, a frame header based on a first sequence may be determined. In some embodiments, one or more operations of 1102 may be performed by the sequence generation unit 610.

The first sequence may be a PN sequence, such as a PN sequence with $m_1$ stage. For example, the frame header may be $L_1$ ($L_1 \geq 1$) PN sequence(s) with $m_1$ stage ($m_1 \geq 3$). The PN sequence may be generated by a linear feedback shift register (LFSR) which is constructed according to a corresponding primitive polynomial. The corresponding primitive polynomial may be expressed as formula (1) shown below:

$$g(x)=x^5+x^2+1 \quad (1)$$

where g(x) may denote the corresponding primitive polynomial.

The linear feedback shift register (LFSR) may be constructed according to the corresponding primitive polynomial. The linear feedback shift register (LFSR) may generate a sequence with a length of n. The length of the sequence may be determined according to formula (2) shown below:

$$n=2^{m_1}-1 \quad (2)$$

where n may denote the length of the sequence; $m_1$ may denote the stage of the sequence of the frame header.

Figure 20:
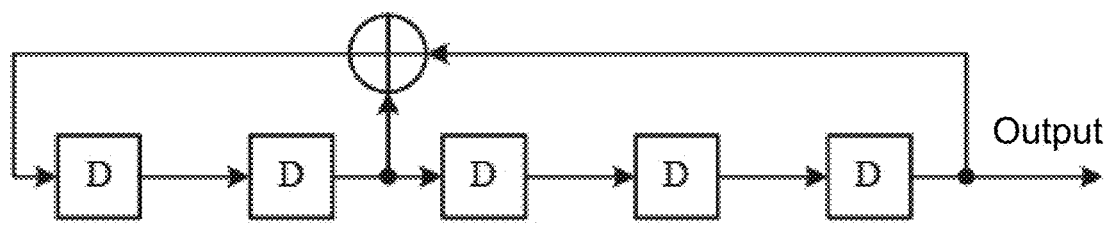
FIG. 20 is a schematic diagram of an exemplary linear feedback shift register (LFSR) according to some embodiments of the present disclosure.

Taking $m_1=5$ for example, a schematic diagram of the linear feedback shift register (LFSR) which is constructed according to the corresponding primitive polynomial may be shown in FIG. 20. The sequence with the length of 31 may be generated by the linear feedback shift register (LFSR).

In 1104, frame data may be encoded. In some embodiments, one or more operations of 1104 may be performed by the processing unit 620.

The encoding method may be a spread spectrum coding method, a channel coding method, or the like, or any combination thereof. For example, the frame data may be spread spectrum coded according to the sequence with the stage of $m_3$. The frequency spectrum of the spread spectrum frame data may be spread in the frequency domain. The corresponding spread spectrum gain may be determined according to formula (3) shown below:

$$G=10 \log_{10}(2^{m_3}-1) \quad (3)$$

where G may refer to the corresponding spread spectrum gain; $m_3$ may denote the stage of the sequence used to spread spectrum process the frame data.

As another example, the frame data may be processed according to the channel coding method. The check bits may be superpose based on the information bit. The redundant information may be used to correct the bit error in the information bit. Different channel coding methods may have different coding gains. In general, the more the redundant information is, the bigger the coding gain is.

In 1106, a frame tail based on a second sequence may be determined. In some embodiments, one or more operations of 1104 may be performed by the sequence generation unit 610.

The second sequence may be a PN sequence, such as a PN sequence with $m_2$ stage. For example, the frame tail may be $L_2$ ($L_2 \geq 1$) PN sequence(s) with $m_2$ stage ($m_2 \geq 3$). In some embodiments, the generation of the frame tail may be the same as the frame header.

In 1108, a data frame including the frame header, the frame data, and the frame tail may be generated. In some embodiments, the data frame may include the frame header, the frame data, and the frame tail. Alternatively, the data frame may include the frame header and the frame data.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the data frame and/or sequences) may be added somewhere in the exemplary process 1100. As another example, the frame data may not be encoded in 1104. As still another example, a data frame including the frame header and the frame data may be generated in 1108.

Figure 12:
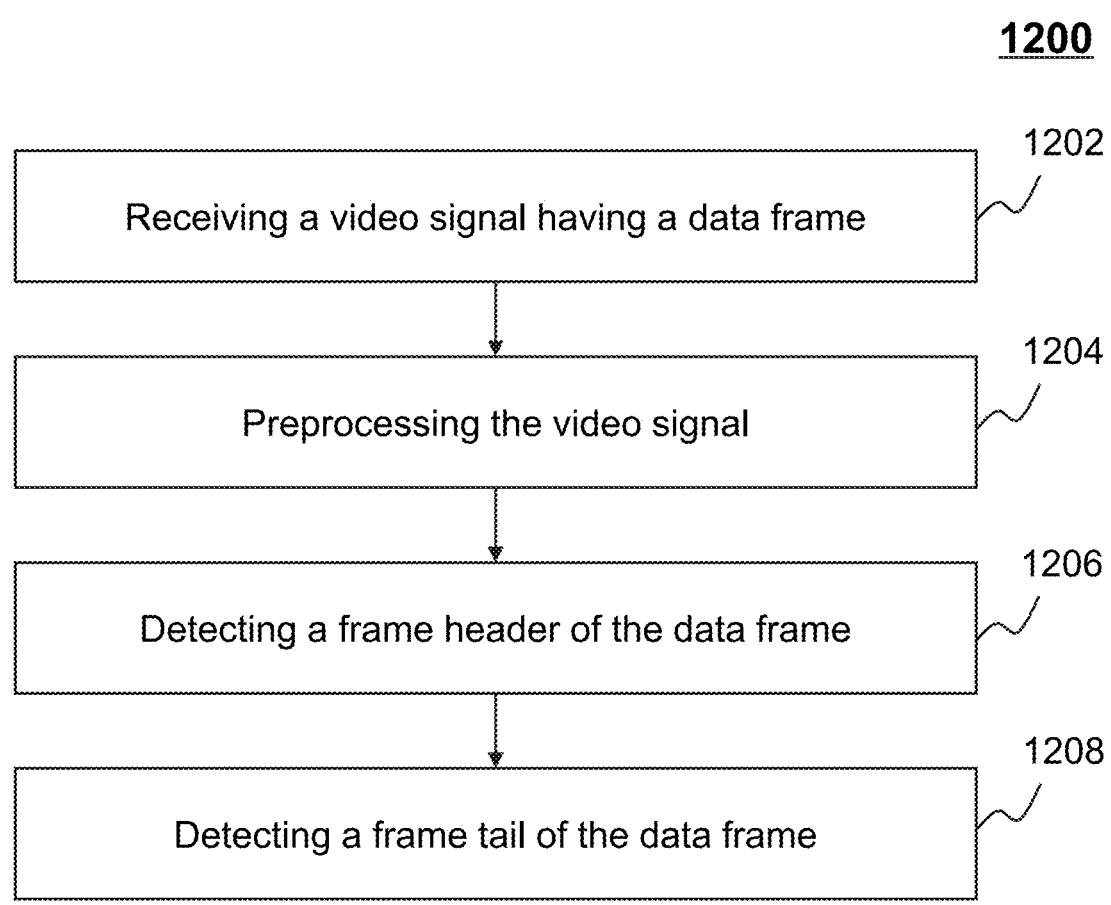
FIG. 12 is a flowchart illustrating an exemplary process for detecting a frame header/tail according to some embodiments of the present disclosure.

FIG. 12 is a flowchart illustrating an exemplary process for detecting a frame header/tail according to some embodiments of the present disclosure. The process 1200 may be executed by the detection module 520. For example, the process 1000 may be implemented as a set of instructions (e.g., an application) stored in the storage ROM 230 or RAM 240. The CPU 220 may execute the set of instructions and may accordingly be directed to perform the process 1200. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 12 and described below is not intended to be limiting. In some embodiments, step 1004 illustrated in process 1000 may be performed according to process 1200.

In 1202, a video signal having a data frame may be received. The video signal having the data frame may be obtained from the data transmission device 120 or retrieved from another source (e.g., the storage 170, the terminal(s) 140). The data frame may be the data frame described elsewhere in this disclosure (e.g., the descriptions related to step 902 of the process 900).

In 1204, the video signal having the data frame may be preprocessed. In some embodiments, one or more operations of 1204 may be performed by the preprocessing unit 710.

The video signal (i.e., a simulation standard video signal, a simulation HD video signal) may include line and field synchronization information. The line and field synchronization information of the video signals with different formats may be different. The line and field synchronization information of the video signal with a known format may be known. In some embodiments, the format of the video signal having the data frame may be estimated, and the line and field synchronization information of the video signal having the data frame may be determined.

In 1206, a frame header of the data frame may be detected. In some embodiments, one or more operations of 1206 may be performed by the operation unit 720 and/or the determination unit 730.

Figure 13:
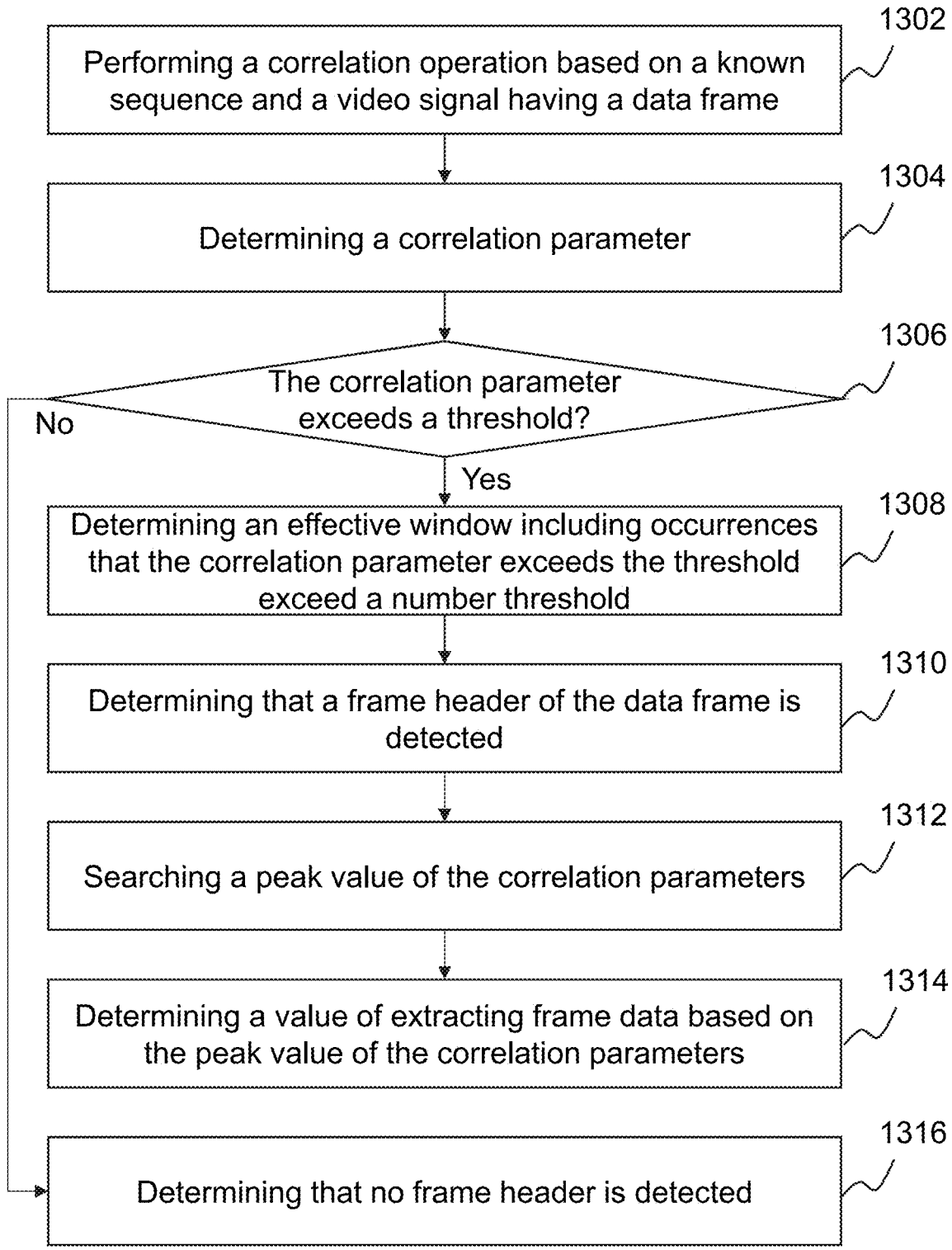
FIG. 13 is a flowchart illustrating an exemplary process for detecting a frame header and calculating a threshold according to some embodiments of the present disclosure.

In some embodiments, the frame header of the data frame may be detected based on a correlation parameter, a threshold, and a number threshold as exemplified in FIG. 13. A method of detecting the frame header of the data frame may be the method of detecting the frame header of the data frame described elsewhere in this disclosure (e.g., the descriptions related to step 1004 of the process 1000 and the process 1300).

In 1208, a frame tail of the data frame may be detected. In some embodiments, one or more operations of 1208 may be performed by the operation unit 720 and/or the determination unit 730.

In some embodiments, a method of detecting the frame tail of the data frame may be the same as the method of detecting the frame header of the data frame.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the video signal having the data frame and/or the line and field synchronization information of the video signal) may be added somewhere in the exemplary process 1200. As another example, step 1208 may be omitted while the data frame includes the frame header and the frame data.

FIG. 13 is a flowchart illustrating an exemplary process for detecting a frame header and calculating a decision threshold according to some embodiments of the present disclosure. The process 1300 may be executed by the operation unit 720 and/or the determination unit 730. For example, the process 1300 may be implemented as a set of instructions (e.g., an application) stored in the storage ROM 230 or RAM 240. The CPU 220 may execute the set of instructions and may accordingly be directed to perform the process 1300. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 13 and described below is not intended to be limiting. In some embodiments, step 1206 illustrated in process 1200 may be performed according to process 1300.

In 1302, a correlation operation based on a known sequence and a video signal having a data frame may be performed. In some embodiments, one or more operations of 1302 may be performed by the operation unit 720. The known sequence may be an autocorrelation and cross-correlation sequence.

In 1304, a correlation parameter may be determined. A correlation parameter may be generated based on a correlation operation with an effective window, and the correlation parameter may represent similarity between part of the known sequence and part of the data frame within the effective window. In some embodiments, one or more operations of 1304 may be performed by the determination unit 730. The correlation parameter may be determined while performing the operation based on the known sequence and the video signal having the data frame. In some embodiments, one or more correlation parameters may be determined with sliding the effective window along the known sequence or the data frame. With each sliding the effective window along the known sequence or the data frame, a different correlation parameter may be generated.

In 1306, whether the correlation parameter exceeds a threshold may be determined. In some embodiments, one or more operations of 1306 may be performed by the determination unit 730. The threshold may be default settings of the data transmission system 100, or may be adjustable based on an instruction from a user.

In response to the determination that the correlation parameter exceeds the threshold, the determination unit 730 may perform step 1308. In 1308, an effective window including occurrences that the correlation parameter exceeds the threshold exceed a number threshold may be determined. The number threshold may be default settings of the data transmission system 100 or may be adjustable based on an instruction from a user. The effective window may be generated based on the determination that the occurrences that the correlation parameter exceeds the threshold exceed the number threshold.

In 1310, a frame header of the data frame may be detected. The frame header of the data frame may be detected based on the determination that the effective window including the occurrences that the correlation parameters exceeds the threshold exceeds the number threshold is determined.

In 1312, a peak value of the correlation parameters may be searched. In some embodiments, the peak value of the correlation parameters may be a maximum of the correlation parameters. In some embodiments, the peak value of the correlation parameters may be searched in the effective window.

In some embodiments, the peak value of the correlation parameters may be determined according to formula (4) shown below:

$$y_1 = \frac{A \times 2^{m_1-1}}{2^{m_1} - 1} \tag{4}$$

where $y_1$ may denote the peak value of the correlation parameters, wherein data 1 and data 0 are represented by 1 and 0 respectively; A may denote amplitude of data 1 of the data frame; and $m_1$ may denote the stage of the sequence of the frame header.

Alternatively, the peak value of the correlation parameters may be determined according to formula (5) shown below:

$$y_2 = \frac{A \times 2^{m_1-1} - B \times (2^{m_1-1} - 1)}{2^{m_1} - 1} \tag{5}$$

where $y_2$ may denote the peak value of the correlation parameters, wherein data 1 and data 0 are represented by 1 and −1 respectively; A may denote the amplitude of data 1 of the data frame; B may denote the amplitude of data 0 of the data frame (B usually is equal to the amplitude of a blanking level); and $m_1$ may denote the stage of the sequence of the frame header.

For $m_1$ is large enough, $y_2$ is approximately equal to $$\frac{A-B}{2},$$

which is the amplitude of the blanking level.

In some embodiments, the peak value of the correlation parameters $\hat{y_1}$ or $\hat{y_2}$ may be searched. The amplitude of data 1 of the data frame may be determined according to formula (6) shown below:

$$\hat{A} = \frac{\hat{y_1} \times (2^{m_1} - 1)}{2^{m_1 - 1}} \quad (6)$$

where $\hat{A}$ may denote the amplitude of data 1 of the data frame, $\hat{y_1}$ may denote the peak value of the correlation parameters, wherein data 1 and data 0 are represented by 1 and 0 respectively; and $m_1$ may denote the stage of the sequence of the frame header.

The amplitude of data 0 of the data frame may be determined according to formula (7) shown below:

$$\hat{B} = \frac{(\hat{y_1} - \hat{y_2}) \times (2^{m_1} - 1)}{2^{m_1 - 1} - 1} \quad (7)$$

where $\hat{B}$ may denote the amplitude of data 0 of the data frame, $\hat{y_1}$ may denote the peak value of the correlation parameters, wherein data 1 and data 0 are represented by 1 and 0 respectively; where $\hat{y_2}$ may denote the peak value of the correlation parameters, wherein data 1 and data 0 are represented by 1 and -1 respectively; and $m_1$ may denote the stage of the sequence of the frame header.

In 1314, a value of extracting frame data based on the peak value of the correlation parameters may be determined. The value of extracting the frame data may represent a start point of extracting the frame data. In some embodiments, the peak value of the correlation parameters may be the value of extracting the frame data. In some embodiments, the value of extracting the frame data may be the decision threshold. The decision threshold may be determined according to formula (8) shown below:

$$C = \frac{\hat{A} + \hat{B}}{2} = \frac{\hat{y_1} \times (2^{m_1} - 1)}{2^{m_1}} + \frac{(\hat{y_1} - \hat{y_2}) \times (2^{m_1} - 1)}{2^{m_1} - 2} \quad (8)$$

where C may denote the decision threshold; $\hat{y_1}$ may denote the peak value of the correlation parameters, wherein data 1 and data 0 are represented by 1 and 0 respectively; where $\hat{y_2}$ may denote the peak value of the correlation parameters, data 1 and data 0 are represented 1 and -1 respectively; and $m_1$ may denote the stage of the sequence of the frame header. If $m_1$ is large enough, C may be approximately equal to 2 $\hat{y_1} - \hat{y_2}$.

In response to the determination that the correlation parameter is less than or equal to the threshold, step 1316 may be executed. In 1316, the determination unit 730 may determine that no frame header of the data frame is detected.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the correlation parameters and/or the value of extracting the frame data) may be added elsewhere in the exemplary process 1300. As another example, if the determination unit 730 determines that the correlation parameter exceeds the threshold in 1306, it may further determine that the frame header of the data frame is detected upon the occurrence of a condition.

Figure 14:
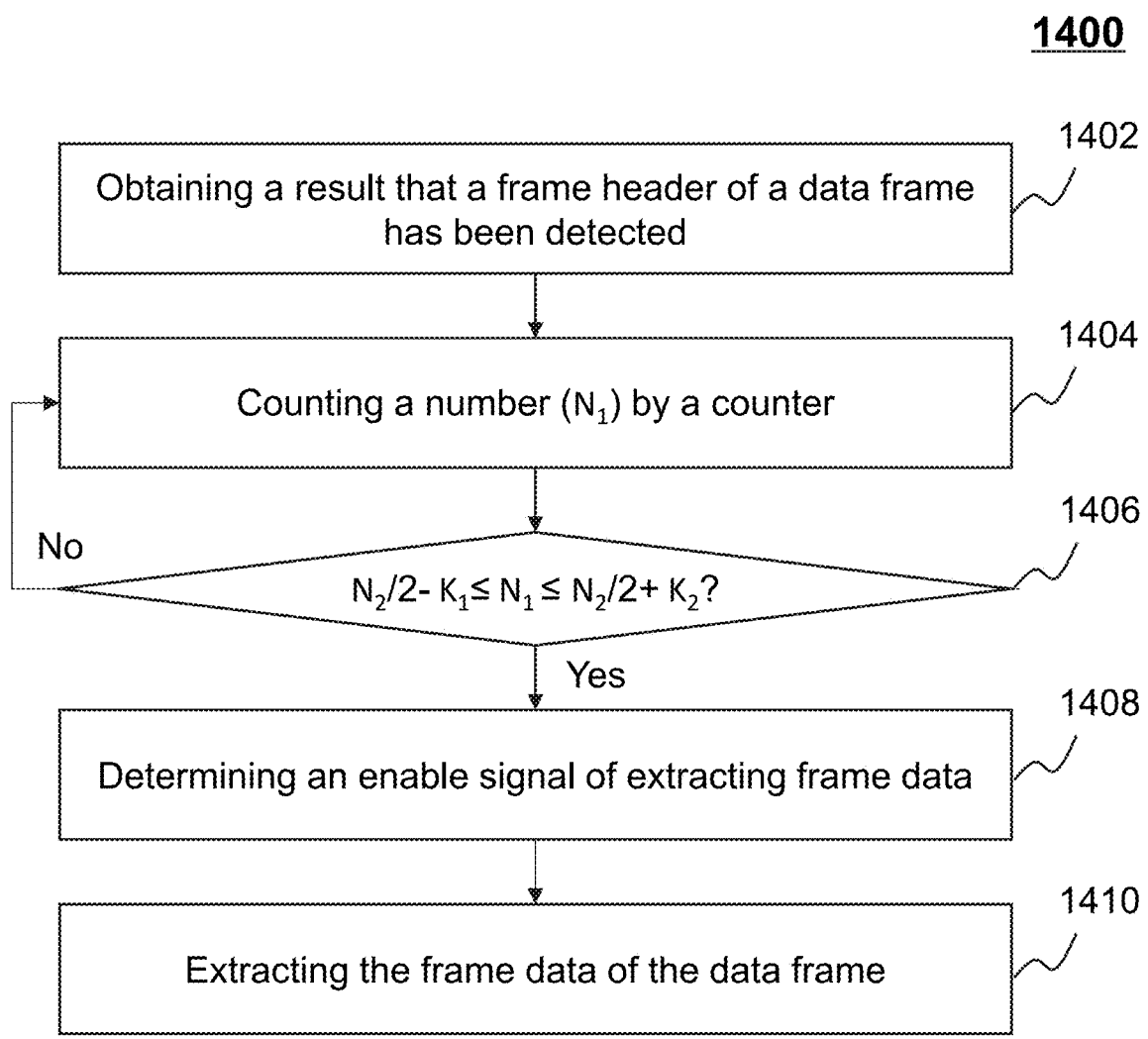
FIG. 14 is a flowchart illustrating an exemplary process for extracting frame data of a data frame according to some embodiments of the present disclosure.

FIG. 14 is a flowchart illustrating an exemplary process for extracting frame data of a data frame according to some embodiments of the present disclosure. The process 1400 may be executed by the extraction module 530. For example, the process 1400 may be implemented as a set of instructions (e.g., an application) stored in the storage ROM 230 or RAM 240. The CPU 220 may execute the set of instructions and may accordingly be directed to perform the process 1400. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 14 and described below is not intended to be limiting. In some embodiments, step 1006 illustrated in process 1000 may be performed according to process 1400.

In 1402, a result that a frame header of a data frame has been detected may be obtained.

In 1404, a number ($N_1$) may be counted. In some embodiments, one or more operations of 1404 may be performed by the counter 810.

The counter 810 may be open after the frame header of the data frame is detected. The counting range of the counter may be 1 to $N_2$. The number $N_2$ may be default settings of the data transmission system 100, or may be adjustable based on an instruction from a user.

In 1406, whether $N_2/2 - K_1 \leq N_1 \leq N_2/2 + K_2$ may be determined. In some embodiments, one or more operations of 1406 may be performed by the determination unit 820.

In response to the determination that the number $N_1$ is in the range of $N_2/2 - K_1$ to $N_2/2 + K_2$, step 1408 may be executed. The numbers $K_1$ and $K_2$ may be default settings of the data transmission system 100, or may be adjustable based on an instruction from a user. In some embodiments, $K_1$ and $K_2$ may be constants, such as nonnegative integers.

In 1408, an enable signal of extracting frame data may be determined. In some embodiments, one or more operations of 1408 may be performed by the determination unit 820. The enable signal may prompt that the frame data of the data frame be extracted on this occasion. The frame data of the data frame may be extracted while the number $N_1$ is in the range of $N_2/2 - K_1$ to $N_2/2 + K_2$.

In 1410, the frame data of the data frame may be extracted. In some embodiments, the frame data of the data frame may be sent to another module (e.g., a CPU) for further processing.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the frame data and/or the enable signal of extracting the frame data) may be added somewhere in the exemplary process 1400. As another example, the enable signal of extracting frame data may be determined while $N_1 = N_2/2$ in 1406.

Figure 15:
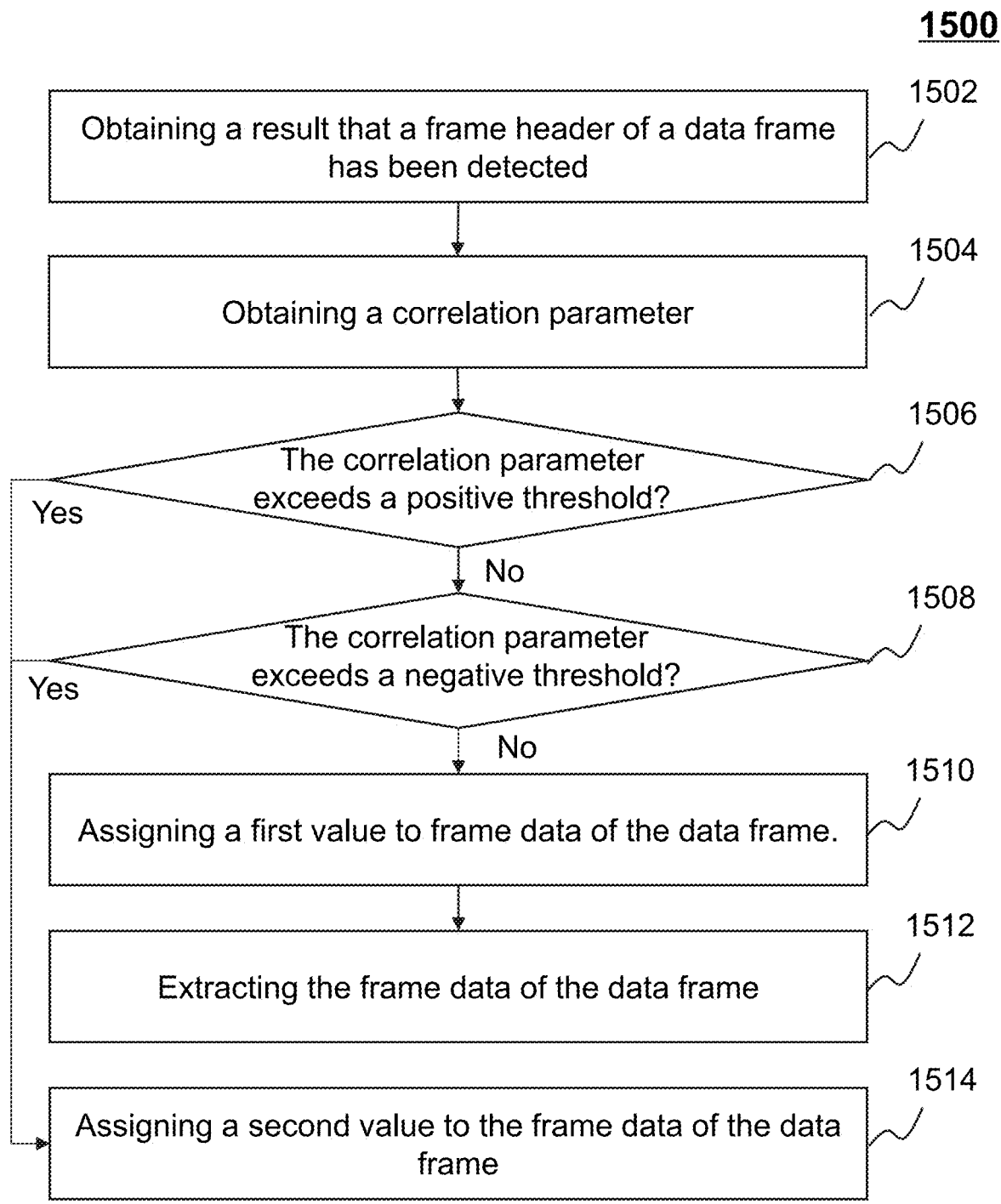
FIG. 15 is a flowchart illustrating an exemplary process for extracting frame data of a data frame according to some embodiments of the present disclosure.

FIG. 15 is a flowchart illustrating an exemplary process for extracting frame data of a data frame according to some embodiments of the present disclosure. The process 1500 may be executed by the extraction module 530. For example, the process 1500 may be implemented as a set of instructions (e.g., an application) stored in the storage ROM 230 or RAM 240. The CPU 220 may execute the set of instructions and may accordingly be directed to perform the process 1500. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 15 and described below is not intended to be limiting. In some embodiments, step 1006 illustrated in process 1000 may be performed according to process 1500.

In 1502, a result that a frame header of a data frame has been detected may be obtained. In 1504, a correlation parameter may be obtained. The correlation parameter may be the correlation parameter described elsewhere in this disclosure (e.g., the descriptions related to step 1304 of the process 1300). In some embodiments, one or more correlation parameters may be obtained.

In 1506, whether the correlation parameter exceeds a positive threshold may be determined. In some embodiments, one or more operations of 1506 may be performed by the determination unit 820. The positive threshold may be default settings of the data transmission system 100, or may be adjustable based on an instruction from a user. In response to the determination that the correlation parameter exceeds the positive threshold, step 1514 may be executed.

In response to the determination that the correlation parameter is less than or equal to the positive threshold, step 1508 may be executed. In 1508, whether the correlation parameter exceeds a negative threshold may be determined. In some embodiments, one or more operations of 1508 may be performed by the determination unit 820. In response to the determination that the correlation parameter exceeds the negative threshold, step 1514 may be executed.

In response to the determination that the correlation parameter is less than or equal to the negative threshold, step 1510 may be executed. In 1510, frame data of the data frame may be assigned to a first value. In some embodiments, one or more operations of 1510 may be performed by the assignment unit 830. The first value may be 0.

In 1512, the frame data of the data frame may be extracted. In some embodiments, one or more operations of 1512 may be performed by the decoding unit 840. In some embodiments, for the frame data have been encoded according to an encoding method, the frame data may be extracted according to a corresponding decoding method. For example, when the encoding method is a spread spectrum coding method, the decoding unit 840 may extract the frame data by despreading the frame data. As another example, when the encoding method is a channel coding method (e.g., a Gray code encoding method), the decoding unit 840 may extract the frame data by decoding the channel coding.

In 1514, the frame data of the data frame may be assigned to a second value. In some embodiments, one or more operations of 1514 may be performed by the assignment unit 830. The second value may be 1.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the frame data, the correlation parameters, the positive threshold and/or the negative threshold) may be added somewhere in the exemplary process 1500. As another example, the soft decision decoding may be used in the process of extracting the frame data of the data frame (not shown in FIG. 15). In the method of the soft decision decoding, the frame data of the data frame may be mean processed. The correlation parameter or the mean processed frame data of the data frame may be normalized. The normalized frame data of the data frame may be expressed as formula (9) shown below:

$$\acute{z} = \frac{2z - (\hat{A} + \hat{B})}{\hat{A} - \hat{B}} \quad (9)$$

where $\acute{z}$ may denote the normalized frame data of the data frame; z may denote the frame data of the data frame before normalization; $\hat{A}$ may denote the amplitude of data 1 of the data frame in formula (6); $\hat{B}$ may denote the amplitude of data 0 of the data frame in formula (7).

The value $\acute{z}$ may be in a vicinity of ±1 because of the influence of noise. The normalized frame data of the data frame may be soft decision decoded.

Figure 16:
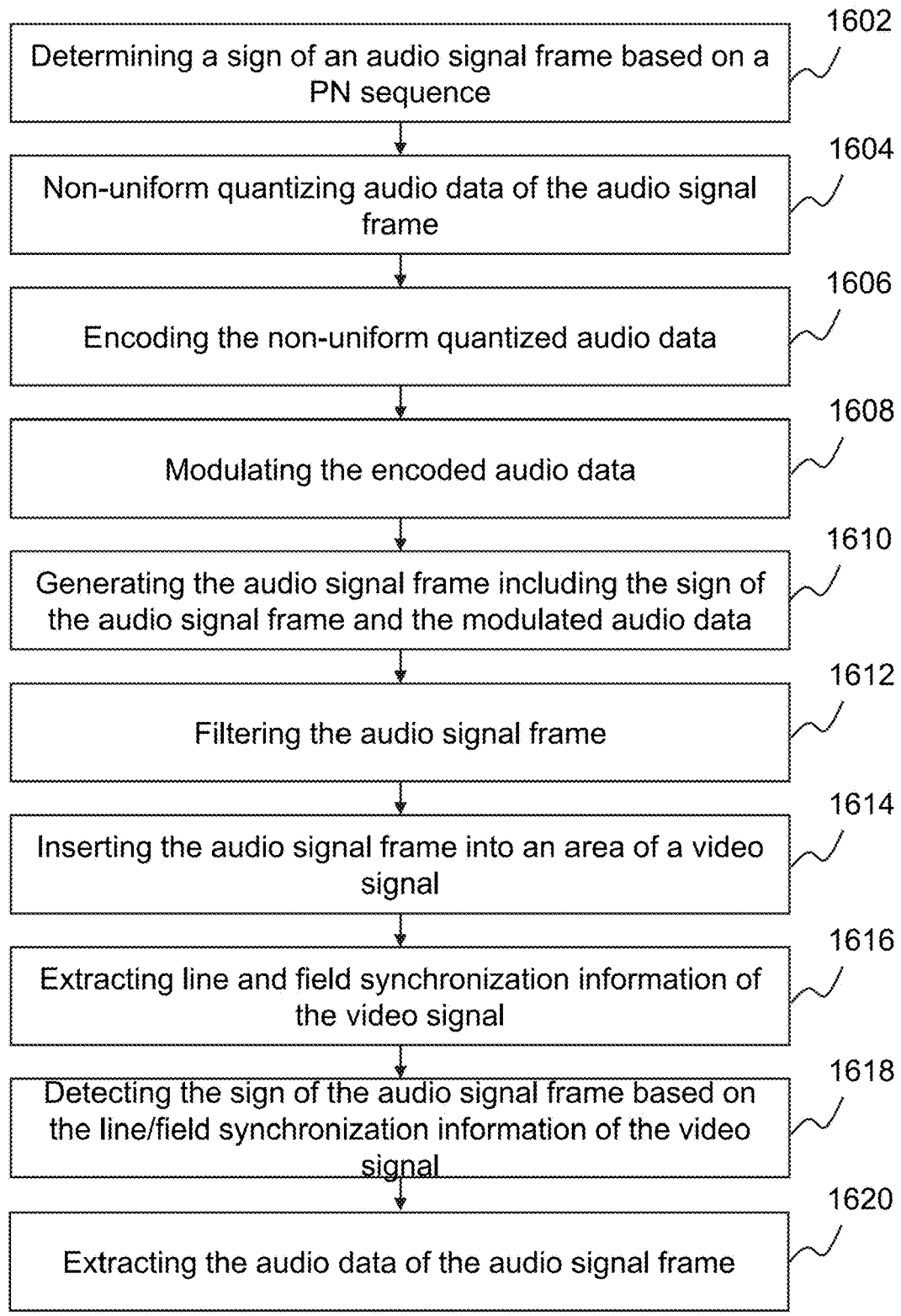
FIG. 16 is a flowchart illustrating an exemplary process for transmitting an audio data in a video signal according to some embodiments of the present disclosure.

FIG. 16 is a flowchart illustrating an exemplary process for transmitting an audio data in a video signal according to some embodiments of the present disclosure. The process 1600 may be executed by the data transmission system 100. For example, the process 1600 may be implemented as a set of instructions (e.g., an application) stored in the storage ROM 230 or RAM 240. The CPU 220 may execute the set of instructions and may accordingly be directed to perform the process 1600. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 16 and described below is not intended to be limiting.

In 1602, a sign of an audio signal frame may be determined based on a PN sequence. In some embodiments, one or more operations of 1602 may be performed by the sequence generation unit 610.

The PN sequence may be a PN sequence with $m_4$ stage. For example, the sign of the audio signal frame may be $L_3$ ($L_3 \geq 1$) PN sequence(s) with $m_4$ stage ($m_4 \geq 3$). The PN sequence may be generated by a linear feedback shift register (LFSR) which is constructed according to a corresponding primitive polynomial. Taking $m_4 = 3$ for example, a PN sequence with the length of 7 (i.e., 2^3−1) may be generated by the linear feedback shift register (LFSR). The data 0 and data 1 of the PN sequence may be the minimum and maximum of the audio signal respectively.

In 1604, audio data of the audio signal frame may be non-uniform quantized. In some embodiments, one or more operations of 1604 may be performed by the processing unit 620. In some embodiments, the audio data of the audio signal frame may be non-uniform quantized according to A-law or μ-law.

In 1606, the non-uniform quantized audio data may be encoded.

In some embodiments, one or more operations of 1606 may be performed by the processing unit 620. In some embodiments, the non-uniform quantized audio data may be encoded according to a Gray code encoding method.

In 1608, the encoded data may be modulated. In some embodiments, one or more operations of 1608 may be performed by the processing unit 620. In some embodiments, the encoded data may be modulated based on a multilevel baseband method.

In 1610, the audio signal frame including the sign of the audio signal frame and the modulated data may be generated.

In 1612, the audio signal frame may be filtered. In some embodiments, one or more operations of 1612 may be performed by the preprocessing unit 710. In some embodiments, the audio signal frame may be filtered based on a shaping filter. For example, the shaping filter may be a raised cosine shaping filter.

In 1614, the audio signal frame may be inserted into an area of a video signal. In some embodiments, one or more operations of 1604 may be performed by the insertion module 420. In some embodiments, the area of the video signal may be an area of between an end of a color synchronization of a video active line and a cut-off point of a line blanking area. In some embodiments, the video signal having the audio signal frame may be transmitted to another device (e.g., the data reception device 130).

In 1616, line and field synchronization information of the video signal may be extracted. In some embodiments, one or more operations of 1604 may be performed by the preprocessing unit 710.

In some embodiments, the format of the video signal having the audio signal frame may be estimated, and the line and field synchronization information of the video signal having the audio signal frame may be determined.

In 1618, the sign of the audio signal frame may be determined based on the line and field synchronization information of the video signal. In some embodiments, one or more operations of 1618 may be performed by the determination unit 730.

In some embodiments, an effective window may be determined based on the line and field synchronization information of the video signal. The sign of the audio signal frame may be determined in the effective window.

In 1620, the audio data of the audio signal frame may be extracted. In some embodiments, one or more operations of 1620 may be performed by the extraction module 530. The audio data of the audio signal frame may be extracted after the sign of the audio signal frame is determined.

In some embodiments, for the audio data have been encoded according to a channel coding method, the extraction module 530 may extract the audio data and calculate an average of the audio data. The extracted audio data or the average of the audio data may be decision processed. The decision processed audio data may be decoding processed and useful information about the audio data may be extracted. For example, the hard decision processed audio data may be decoding processed according to the decoding method. As another example, the normalized audio data may be soft decision decoding processed. In some embodiments, for the audio data have been modulated by the multilevel baseband, the extraction module 530 may extract the audio based on the multilevel baseband demodulation. The multilevel baseband demodulation may reduce interference in the transmission process.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the generated audio signal frame and/or the video signal having the audio signal) may be added somewhere in the exemplary process 1600. As another example, the soft decision decoding may be used in the process of extracting the frame data of the data frame (not shown in FIG. 16). In the method of the soft decision decoding, the audio data of the audio signal frame may be mean processed. The correlation parameter or the mean processed audio data of the audio signal frame may be normalized. Taking multilevel baseband modulation with 4 stage for example, the normalized frame data of the data frame may be expressed as formula (10) shown below:

$$\hat{z} = \frac{3}{\sqrt{5}} \frac{2z - (\hat{A} + \hat{B})}{\hat{A} - \hat{B}} \quad (10)$$

where $\hat{z}$ may denote the normalized frame data of the data frame; z may denote the frame data of the data frame before normalization; $\hat{A}$ may denote the amplitude of data 1 of the data frame in formula (13); $\hat{B}$ may denote the amplitude of data 0 of the data frame in formula (14).

Figure 17:
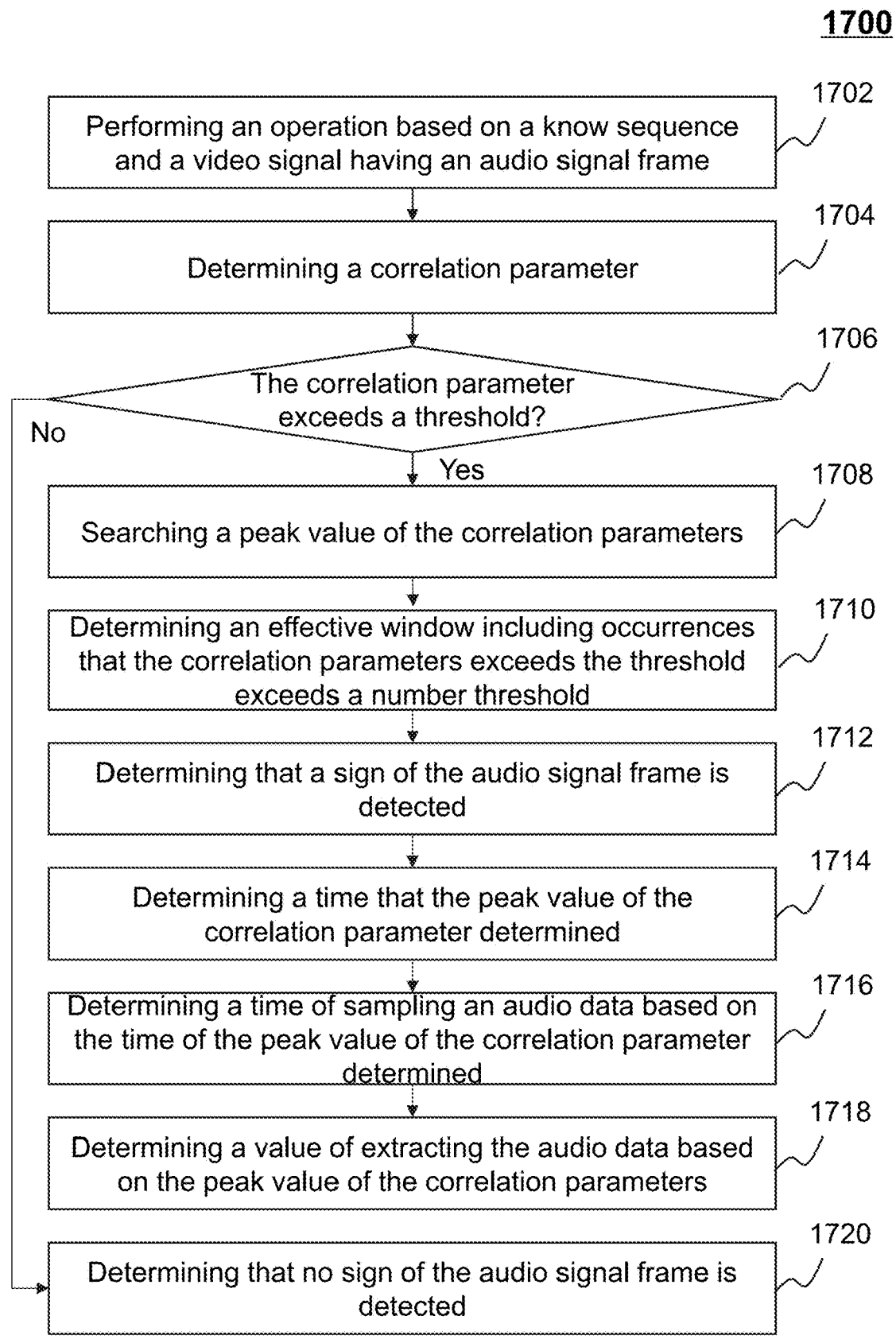
FIG. 17 is a flowchart illustrating an exemplary process for detecting a sign of an audio signal frame and calculating a threshold according to some embodiments of the present disclosure.

FIG. 17 is a flowchart illustrating an exemplary process for detecting a sign of an audio signal frame and calculating a decision threshold according to some embodiments of the present disclosure. The process 1700 may be executed by the detection module 520. For example, the process 1700 may be implemented as a set of instructions (e.g., an application) stored in the storage ROM 230 or RAM 240. The CPU 220 may execute the set of instructions and may accordingly be directed to perform the process 1700. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 17 and described below is not intended to be limiting. In some embodiments, step 1618 illustrated in process 1600 may be performed according to process 1700.

In 1702, an operation based on a known sequence and a video signal having an audio signal frame may be performed. In some embodiments, one or more operations of 1702 may be performed by the operation unit 720. The known sequence may be an autocorrelation and cross-correlation sequence.

In 1704, a correlation parameter may be determined. In some embodiments, one or more operations of 1704 may be performed by the determination unit 730. The correlation parameter may be determined while performing the operation based on the known sequence and the video signal having the audio signal frame. In some embodiments, one or more correlation parameters may be determined.

In 1706, whether the correlation parameter exceeds a threshold may be determined. In some embodiments, one or more operations of 1706 may be performed by the determination unit 730.

The threshold may be default settings of the data transmission system 100, or may be adjustable based on an instruction from a user. In response to the determination that the correlation parameter exceeds the threshold, step 1708 may be executed. In 1708, a peak value of the correlation parameters may be searched. In some embodiments, one or more operations of 1708 may be performed by the determination unit 730. In some embodiments, the peak value of the correlation parameters may be a maximum of the correlation parameters.

In some embodiments, the peak value of the correlation parameters may be determined according to formula (11) shown below:

$$y_1 = \frac{A \times 2^{m_4-1}}{2^{m_4} - 1} \tag{11}$$

where $y_1$ may denote the peak value of the correlation parameters, wherein data 1 and data 0 are represented by 1 and 0 respectively; A may denote amplitude of data 1 of the audio signal frame; and $m_4$ may denote the stage of the sequence of the sign of the audio signal frame.

In some embodiments, the peak value of the correlation parameters may be determined according to formula (12) shown below:

$$y_2 = \frac{A \times 2^{m_4-1} - B \times (2^{m_4-1} - 1)}{2^{m_3} - 1} \tag{12}$$

where $y_2$ may denote the peak value of the correlation parameters, wherein data 1 and data 0 are represented by 1 and −1 respectively; A may denote the amplitude of data 1 of the audio signal frame; B may denote the amplitude of data 0 of the audio signal frame (B usually is equal to the amplitude of a blanking level); and $m_4$ may denote the stage of the sequence of the sign of the audio signal frame.

If $m_4$ is large enough, $y_2$ may be approximately equal to $$\frac{A-B}{2},$$

which is the amplitude of the blanking level.

In some embodiments, the peak value of the correlation parameters $\hat{y_1}$ or $\hat{y_2}$ may be searched. The amplitude of data 1 of the audio signal frame may be determined according to formula (13) shown below:

$$\hat{A} = \frac{\hat{y_1} \times (2^{m_4} - 1)}{2^{m_4-1}} \tag{13}$$

where $\hat{A}$ may denote the amplitude of data 1 of the audio signal frame, $\hat{y_1}$ may denote the peak value of the correlation parameters, wherein data 1 and data 0 are represented by 1 and 0 respectively; and $m_4$ may denote the stage of the sequence of the sign of the audio signal frame.

The amplitude of data 0 of the data frame may be determined according to formula (14) shown below:

$$\hat{B} = \frac{(\hat{y_1} - \hat{y_2}) \times (2^{m_4} - 1)}{2^{m_4-1} - 1} \tag{14}$$

where $\hat{B}$ may denote the amplitude of data 0 of the audio signal frame, $\hat{y_1}$ may denote the peak value of the correlation parameters, wherein data 1 and data 0 are represented by 1 and 0 respectively; $y_2$ may denote the peak value of the correlation parameters, wherein data 1 and data 0 are represented by 1 and −1 respectively; and $m_4$ may denote the stage of the sequence of the sign of the audio signal frame.

In 1710, an effective window including occurrences that the correlation parameter exceeds the threshold exceed a number threshold may be determined. In some embodiments, one or more operations of 1710 may be performed by the determination unit 730.

The number threshold may be default settings of the data transmission system 100, or may be adjustable based on an instruction from a user. The effective window may be generated based on the determination that the occurrences that the correlation parameters exceeds the threshold exceeds the number threshold.

In 1712, a sign of the audio signal frame may be detected. The sign of the audio signal frame may be detected based on the determination that the effective window including the occurrences that the correlation parameter exceeds the threshold exceed the number threshold is determined.

In 1714, a time that the peak value of the correlation parameters determined may be determined. In some embodiments, one or more operations of 1714 may be performed by the determination unit 730.

In 1716, a time of sampling an audio data based on the time that the peak value of the correlation parameter determined may be determined. In some embodiments, one or more operations of 1716 may be performed by the determination unit 730.

In 1718, a value of extracting the audio data based on the peak value of the correlation parameters may be determined. The value of extracting the audio data may represent a start point of extracting the audio data. In some embodiments, the peak value of the correlation parameters may be the value of extracting the frame data. In some embodiments, the value of extracting the audio data may be the decision threshold. The decision threshold may be determined based on the multilevel baseband modulation with K level. Taking K=4 and $m_4$=3 for example, the decision thresholds may be determined according to formulas (15)-(17) shown below:

$$C_1 = \frac{5\hat{A} + \hat{B}}{6} = \frac{5\hat{y_1} \times (2^{m_4} - 1)}{2^{m_4}} + \frac{(\hat{y_1} - \hat{y_2}) \times (2^{m_4} - 1)}{2^{m_1} - 2} = \frac{35\hat{y_1}}{8} + \frac{7(\hat{y_1} - \hat{y_2})}{6} \tag{15}$$

$$C_2 = \frac{\hat{A} + \hat{B}}{2} = \frac{\hat{y_1} \times (2^{m_4} - 1)}{2^{m_4}} + \frac{(\hat{y_1} - \hat{y_2}) \times (2^{m_4} - 1)}{2^{m_4} - 2} = \frac{7\hat{y_1}}{8} + \frac{7(\hat{y_1} - \hat{y_2})}{6} \tag{16}$$

$$C_3 = \frac{\hat{A} + 5\hat{B}}{2} = \frac{\hat{y_1} \times (2^{m_4} - 1)}{2^{m_4}} + \frac{(\hat{y_1} - \hat{y_2}) \times (2^{m_4} - 1)}{2^{m_4} - 2} = \frac{7\hat{y_1}}{8} + \frac{35(\hat{y_1} - \hat{y_2})}{6} \tag{17}$$

where $C_1, C_2, C_3$ may denote the decision thresholds; $\hat{A}$ may denote the amplitude of data 1 of the audio signal frame; $\hat{B}$ may denote the amplitude of data 0 of the audio signal frame, $\hat{y_1}$ may denote the peak value of the correlation parameters, wherein data 1 and data 0 are represented by 1 and 0 respectively; where $\hat{y_2}$ may denote the peak value of the correlation parameters, and $m_4$ may denote the stage of the sequence of the sign of the audio signal.

Taking multilevel baseband modulation with the level of 4 for example, the normalized frame data of the data frame may be expressed as formula (18) shown below:

$$\hat{z} = \begin{cases} 3 & z > C_1 \\ 2 & C_2 < z < C_1 \\ 1 & C_3 < z < C_2 \\ 0 & z < C_3 \end{cases} \quad (18)$$

where $\hat{z}$ may denote the normalized frame data of the data frame; $C_1, C_2, C_3$ may denote the decision thresholds; z may denote the frame data of the data frame before normalization.

In response to the determination that the correlation parameter is less than or equal to the threshold, step 1720 may be executed. In 1720, the determination unit 730 may determine that no sign of the audio signal frame is detected.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., steps for storing the generated audio signal frame and/or the video signal having the audio signal) may be added somewhere in the exemplary process 1700.

Figure 18:
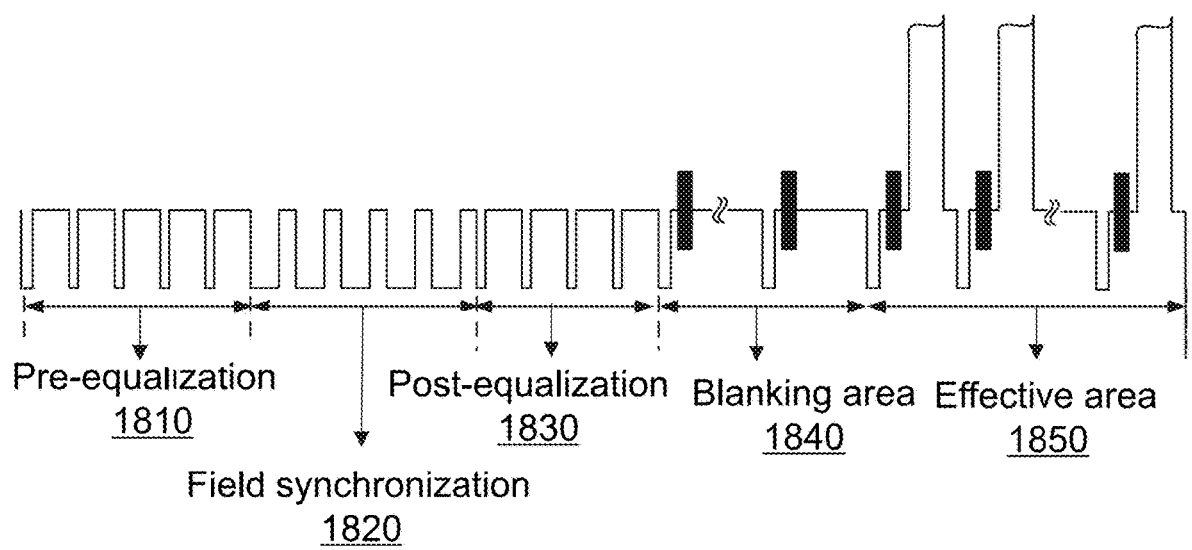
FIG. 18 is a schematic diagram of an exemplary format of a composite video broadcast signal (CVBS) according to some embodiments of the present disclosure.

FIG. 18 is a schematic diagram of an exemplary format of a composite video broadcast signal (CVBS) frame according to some embodiments of the present disclosure. As shown in FIG. 18, the composite video broadcast signal frame may include pre-equalization 1810, field synchronization 1820, post-equalization 1830, blanking area 1840, and effective area 1850.

Figure 19:
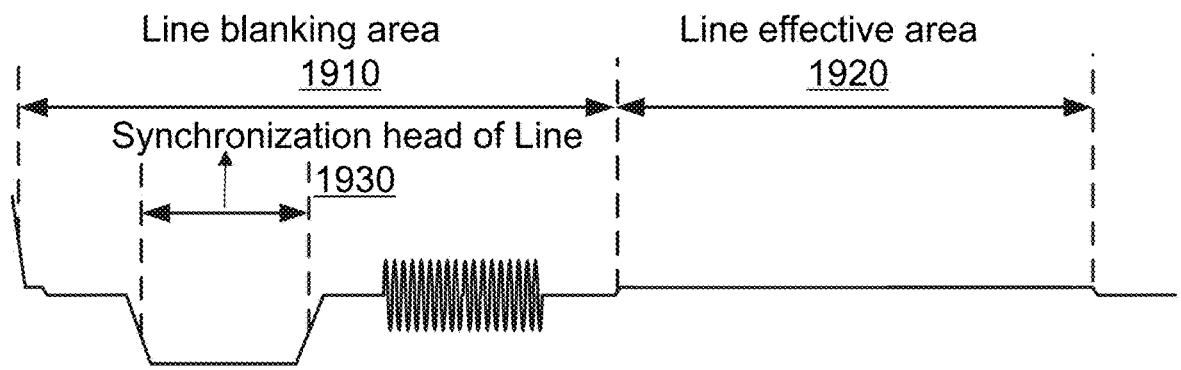
FIG. 19 is a schematic diagram of an exemplary format of a blanking line according to some embodiments of the present disclosure.

FIG. 19 is a schematic diagram of an exemplary format of a blanking line according to some embodiments of the present disclosure. As shown in FIG. 19, the blanking line may include a line blanking area 1910 and a line effective area 1920. There may be a synchronization head of line 1930 in the line effective area. The data frame may be placed in the effective area of line, which may not affect the line and field synchronization and utilize the idle time of the blanking line effectively.

FIG. 20 is a schematic diagram of an exemplary linear feedback shift register (LFSR) according to some embodiments of the present disclosure. Taking $m_1=5$ for example, a schematic diagram of the linear feedback shift register (LFSR) which is constructed according to a corresponding primitive polynomial may be generated. The sequence with a length of 31 (i.e., $2^5-1$) may be generated by the linear feedback shift register (LFSR) shown in FIG. 20.

Figure 21:
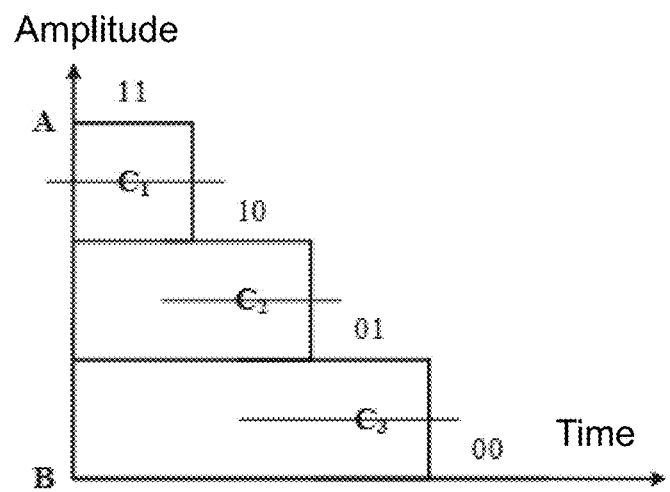
FIG. 21 is a schematic diagram of an exemplary multi-level baseband modulation according to some embodiments of the present disclosure.

FIG. 21 is a schematic diagram of an exemplary multi-level baseband modulation according to some embodiments of the present disclosure. As shown in FIG. 21, a corresponding amplitude of maximum level of a modulating signal may be no higher than a maximum amplitude of a video signal.

Figure 22:
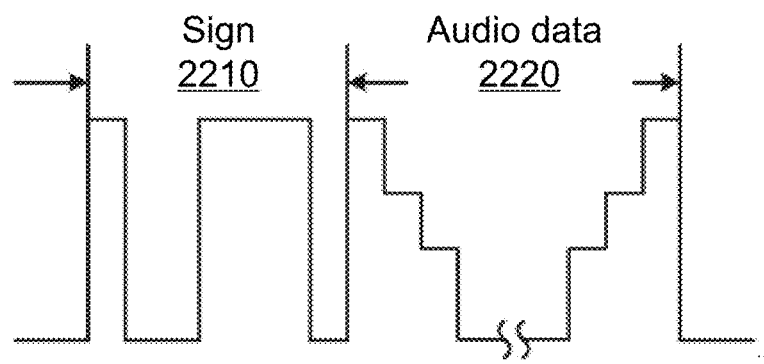
FIG. 22 is a schematic diagram of an exemplary structure of an audio signal according to some embodiments of the present disclosure.

FIG. 22 is a schematic diagram of an exemplary structure of an audio signal according to some embodiments of the present disclosure. As shown in FIG. 22, the audio signal may include a sign 2210 and audio data 2220.

Figure 23:
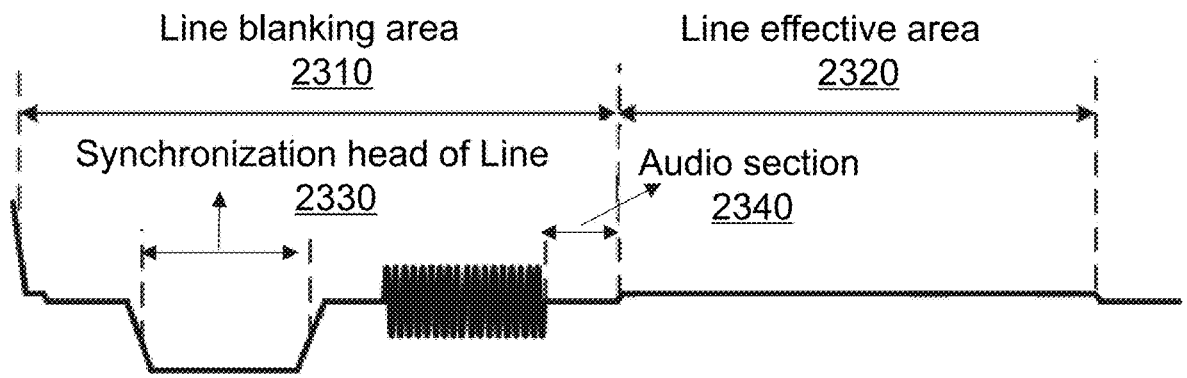
FIG. 23 is a schematic diagram of exemplary formats of a blanking line and an effective line according to some embodiments of the present disclosure.

FIG. 23 is a schematic diagram of exemplary formats of a blanking line and an effective line according to some embodiments of the present disclosure. As shown in FIG. 23, the blanking line may include a line blanking area 2310 and a line effective area 2320. There may be a synchronization head of line 2330 in the line effective area. An audio frame may be inserted an area (an audio section 2340) between an end of a color synchronization of an active line and a cut-off point of the line blanking area.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method implemented on at least one device each of which has at least one processor and storage, the method comprising:
    generating an audio signal frame including at least a frame header, a frame tail, and frame data, the frame header being a sign of the audio signal frame and including at least one autocorrelation and cross-correlation sequence, the frame tail including at least one autocorrelation and cross-correlation sequence and having same content as the frame header, and the frame data including audio data of the audio signal frame;
    inserting the audio signal frame into an area of a video signal, wherein the inserted area of the video signal is not an area of line and field synchronization or an area of effective video; and
    transmitting the video signal having the audio signal frame to another device;
    wherein the frame header is detected upon a determination that a correlation parameter included in an effective window exceeds a threshold, the correlation parameter representing a similarity between part of known sequences and part of the audio signal frame within the effective window, and a next data frame is obtained according to an end of the frame tail or a number of the frame data extracted from the audio signal frame reaching a set number.

2. The method of claim 1, wherein an audio of the audio signal frame is modulated based on a multilevel baseband method.

3. The method of claim 1, wherein the audio signal frame is processed by a shaping filter, the shaping filter including a raised cosine shaping filter.

4. The method of claim 1, wherein the inserted area of the video signal is one of:
    an area between an end of a color synchronization of a video active line and a cut-off point of a line blanking area,
    an area between an end of the color synchronization of a blanking line and the cut-off point of a line blanking area, or
    an effective area of a blanking line.

5. The method of claim 1, wherein the autocorrelation and cross-correlation sequence is a Pseudo-Noise (PN) sequence or a Gold sequence.

6. The method of claim 1, wherein the frame data are encoded according to a spread spectrum coding method or a channel coding method.

7. A method implemented on at least one device each of which has at least one processor and storage, the method comprising:
    obtaining a video signal having an audio signal frame, wherein the audio signal frame is inserted into an area of the video signal, the audio signal frame including at least a frame header, a frame tail, and frame data, the frame header being a sign of the audio signal frame and including at least one autocorrelation and cross-correlation sequence, the frame tail including at least one autocorrelation and cross-correlation sequence and having same content as the frame header, and the frame data including audio data of the audio signal frame, wherein the inserted area of the video signal is not an area of line and field synchronization or an area of effective video;
    detecting the frame header of the audio signal frame upon a determination that a correlation parameter included in an effective window exceeds a threshold, the correlation parameter representing a similarity between part of known sequences and part of the audio signal frame within the effective window;
    extracting the frame data of the audio signal frame based on the frame header of the audio signal frame; and
    obtaining a next data frame according to an end of the frame tail or a number of the frame data extracted from the audio signal frame reaching a set number.

8. The method of claim 7, wherein the audio signal frame is non-uniform quantized according to A-law or µ-law.

9. The method of claim 7, wherein an audio of the audio signal frame is modulated based on a multilevel baseband method.

10. The method of claim 7, wherein the inserted area of the video signal is one of:
- an area between an end of a color synchronization of a video active line and a cut-off point of a line blanking area,
- an area between an end of the color synchronization of a blanking line and the cut-off point of a line blanking area, or
- an effective area of a blanking line.

11. The method of claim 7, wherein the autocorrelation and cross-correlation sequence is a Pseudo-Noise (PN) sequence or a Gold sequence.

12. The method of claim 7, wherein the frame data are encoded according to a spread spectrum coding method or a channel coding method.

13. A system, comprising:
- at least one storage medium including a set of instructions for transmitting data; and
- at least one processor configured to communicate with the at least one storage medium, wherein when executing the set of instructions, the at least one processor is configured to cause the system to:
  - generate an audio signal frame including at least a frame header, a frame tail, and frame data, the frame header being a sign of the audio signal frame and including at least one autocorrelation and cross-correlation sequence, the frame tail including at least one autocorrelation and cross-correlation sequence and having same content as the frame header, and the frame data including audio data of the audio signal frame;
  - insert the audio signal frame into an area of a video signal, wherein the inserted area of the video signal is not an area of line and field synchronization or an area of effective video;
  - transmit the video signal having the audio signal frame to another device;
  - wherein the frame header is detected upon a determination that a correlation parameter included in an effective window exceeds a threshold, the correlation parameter representing a similarity between part of known sequences and part of the audio signal frame within the effective window, and a next data frame is obtained according to an end of the frame tail or a number of the frame data extracted from the audio signal frame reaching a set number.

* * * * *